(12) United States Patent
Ishikawa et al.

(10) Patent No.: US 6,671,606 B2
(45) Date of Patent: Dec. 30, 2003

(54) ANTISKID BRAKE CONTROL SYSTEM

(75) Inventors: Atsushi Ishikawa, Kanagawa (JP); Gen Inoue, Kanagawa (JP); Nobuyuki Ohtsu, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/122,319

(22) Filed: Apr. 16, 2002

(65) Prior Publication Data

US 2002/0156566 A1 Oct. 24, 2002

(30) Foreign Application Priority Data

Apr. 18, 2001 (JP) .......................... 2001-119497

(51) Int. Cl.$^7$ .............................. G06F 7/00; B60T 8/66
(52) U.S. Cl. ........................... 701/71; 701/78; 303/166; 303/168
(58) Field of Search ............................. 701/71, 74, 75, 701/78, 82, 83; 303/154, 166, 168

(56) References Cited

U.S. PATENT DOCUMENTS

| | | | | | |
|---|---|---|---|---|---|
| 4,652,060 | A | * | 3/1987 | Miyake | 303/170 |
| 5,282,676 | A | * | 2/1994 | Takeda et al. | 303/113.2 |
| 5,954,406 | A | * | 9/1999 | Sawada | 303/122.09 |
| 6,089,681 | A | * | 7/2000 | Watanabe | 303/158 |

* cited by examiner

*Primary Examiner*—Yonel Beaulieu
(74) *Attorney, Agent, or Firm*—Foley & Lardner

(57) ABSTRACT

In an antiskid brake control system, an ECU estimates a wheel slip in accordance with a sensed wheel speed and controls a fluid pressure control valve for braking operation in accordance with the estimated wheel slip for an antiskid brake control, the fluid pressure being reduced when the wheel slip is enlarged and being increased when the wheel slip is lowered. When a vehicle-body speed is smaller than a predetermined quick pressure reduction prohibiting speed, the ECU performs a quick pressure reduction prohibiting control to restrain a quick pressure reduction having a greater reduction amount than a predetermined reduction amount.

14 Claims, 18 Drawing Sheets

ANTISKID BRAKE CONTROL SYSTEM

BACKGROUND OF THE INVENTION

The present invention relates to antiskid brake control systems for carrying out control of the braking fluid pressure to prevent wheel lock during braking, i.e. antiskid brake control so called, particularly, at low vehicle speed.

The antiskid brake control systems serve to control the wheel-cylinder pressure or braking fluid pressure to prevent wheel lock during braking for stabilization of the behavior of a vehicle body. Generally, the antiskid brake control systems are constructed to carry out pressure increasing control for increasing the braking fluid pressure, pressure reducing control for reducing the braking fluid pressure, pressure holding control for holding the braking fluid pressure, pressure gradually increasing control for gradually increasing the braking fluid pressure, etc. as appropriate in accordance with the relative relationship between the vehicle-body speed and the wheel speed, i.e. the slip ratio so called.

During braking, repeated involved occurrence of nosedive and squat produces load variations in front and rear wheels. The load variations can occur, particularly, at the initial stage of braking, and stabilize thereafter comparatively. Such load variations affect antiskid brake control seriously. Specifically, even if the braking fluid pressure is controlled at a value appropriate to, e.g. increased wheel load, subsequent load variations bring a reduction in wheel load to make the braking fluid pressure excessive, heightening the lock tendency of the wheels. Particularly, when load variations occur in the low-speed area where the wheel speed is low per se, zero wheel speed, i.e. wheel lock, is apt to be produced.

If the wheels lock due to load variations or the like, elimination of wheel lock during a short period of time requires a quick pressure reduction. However, frequent execution of quick pressure reduction leads to increased amount of brake fluid discharged from a wheel cylinder to a reservoir. Since further pressure reduction cannot be carried out if the amount of discharged brake fluid reaches the capacity of the reservoir, brake fluid should quickly be returned to a brake circuit by using a large-capacity pump. The use of a large-capacity pump results in an increase in manufacturing cost and size of the system.

Wheel lock is apt to occur in the low-speed area as described above, whereas if a quick pressure reduction is carried out in the low-speed area, a driver will have an unfavorable G lowering feel so called or feel that deceleration is decreased suddenly.

With the structure wherein the amount of pressure reduction is set in accordance with wheel acceleration, occurrence with wheel lock may cause zero wheel acceleration, resulting in impossible achievement of appropriate amount of pressure reduction.

SUMMARY OF THE INVENTION

It is, therefore, an object of the present invention to provide antiskid brake control systems which contribute to a reduction in manufacturing cost and size of the system and to an enhancement in a drive feel, particularly, in the low-speed area.

The present invention provides generally an antiskid brake control system, which comprises: a sensor which senses a wheel speed; a braking device comprising a valve which allows increase and reduction in a fluid pressure in a wheel cylinder; and an electronic control unit (ECU) connected to the sensor and the braking device, the ECU estimating a wheel slip in accordance with the sensed wheel speed and controlling the valve for braking operation in accordance with the estimated wheel slip for an antiskid brake control, the fluid pressure being reduced when the wheel slip is enlarged and being increased when the wheel slip is lowered, the ECU performing a quick pressure reduction prohibiting control to restrain a quick pressure reduction having a greater reduction amount than a predetermined reduction amount when a vehicle-body speed is smaller than a predetermined quick pressure reduction prohibiting speed.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
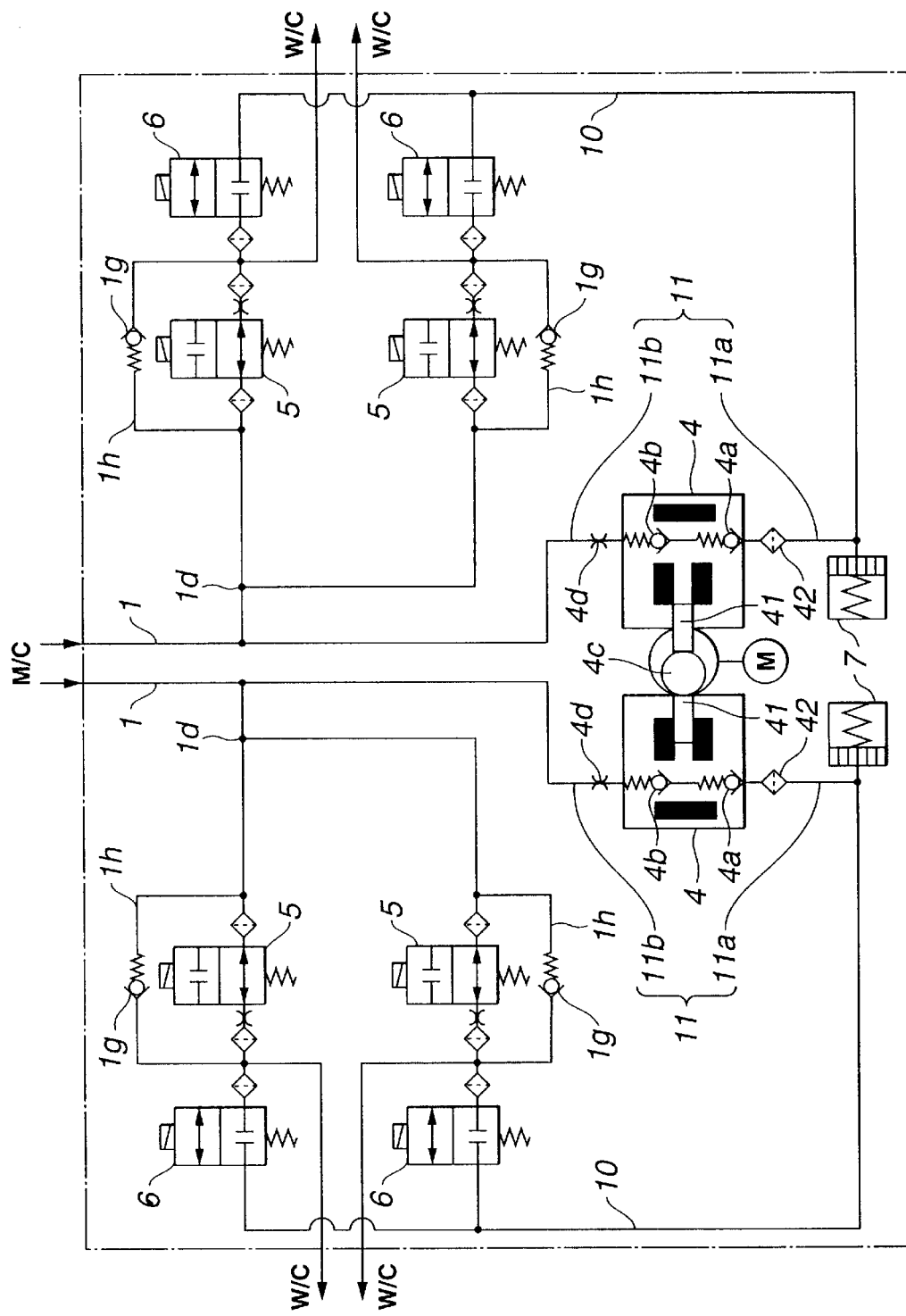
FIG. 1 is a diagram showing a hydraulic circuit for a braking device in an antiskid brake control system embodying the present invention.

Referring to the drawings, a description will be made with regard to an antiskid brake control system embodying the present invention. The first embodiment corresponds to the invention described in all claims.

Before describing the configuration of the first embodiment, the configuration of a braking device will be described. Referring to FIG. 1, a master cylinder M/C is connected to wheel cylinders W/C of four wheels via two brake circuits 1, 1.

Each brake circuit 1 is branched at a junction 1d into two wheel cylinders W/C. Pressure increasing valves 5, 5 are provided downstream of junction 1d or the side of wheel cylinders W/C. Each pressure increasing valve 5 comprises a normally open 2-port 2-position ON/OFF solenoid valve which is open during non-operation and closed during operation by the force of a spring. Pressure increasing valve 5 has a bypass passage 1h arranged parallel therewith to smoothly return brake fluid from wheel cylinder W/C when braking operation comes to an end. A one-way valve 1g is arranged in bypass passage 1h to allow only returning from downstream or the side of wheel cylinder W/C to upstream or the side of master cylinder M/C.

A drain circuit 10 is arranged downstream of pressure increasing valve 5 to connect brake circuit 1 and a reservoir 7. Drain circuit 10 is provided with pressure reducing valves 6. Each pressure reducing valve 6 comprises a normally closed 2-port 2-position ON/OFF solenoid valve which is closed during non-operation and open during operation.

Drain circuit 10 is arranged upstream of junction 1d in brake circuit 1 via a circulating circuit 11. A pump 4 is provided in circulating circuit 11 to return brake fluid stored in reservoir 7 to brake circuit 1. Circulating circuit 11 comprises a suction circuit 11a and a discharge circuit 11b.

Pump 4 sucks brake fluid from suction circuit 11a and discharges it to discharge circuit 11b through reciprocation of a set of opposite arranged plungers 41 by means of a cam 4c rotated by a motor M. Pump 4 comprises a suction valve 4a and a discharge valve 4b for preventing reverse flow, wherein a filter member 42 is provided on the suction side, and a pulsation absorbing damper 4d is provided on the discharge side.

Therefore, when a wheel tends to lock during braking, the braking device allows antiskid brake control for carrying out braking while preventing wheel lock by proper repetition of pressure reducing control for reducing the brake fluid pressure by discharging brake fluid of wheel cylinder W/C into reservoir 7 by opening pressure reducing valve 6 and closing pressure increasing valve 5 in the circuit connected to wheel cylinder W/C of the wheel and pressure increasing control for supplying the master-cylinder pressure to wheel cylinder W/C by opening pressure increasing valve 5 and closing pressure reducing valve 6, or adding pressure holding control for closing both pressure increasing valve 5 and pressure reducing valve 6 as necessary.

Figure 2:
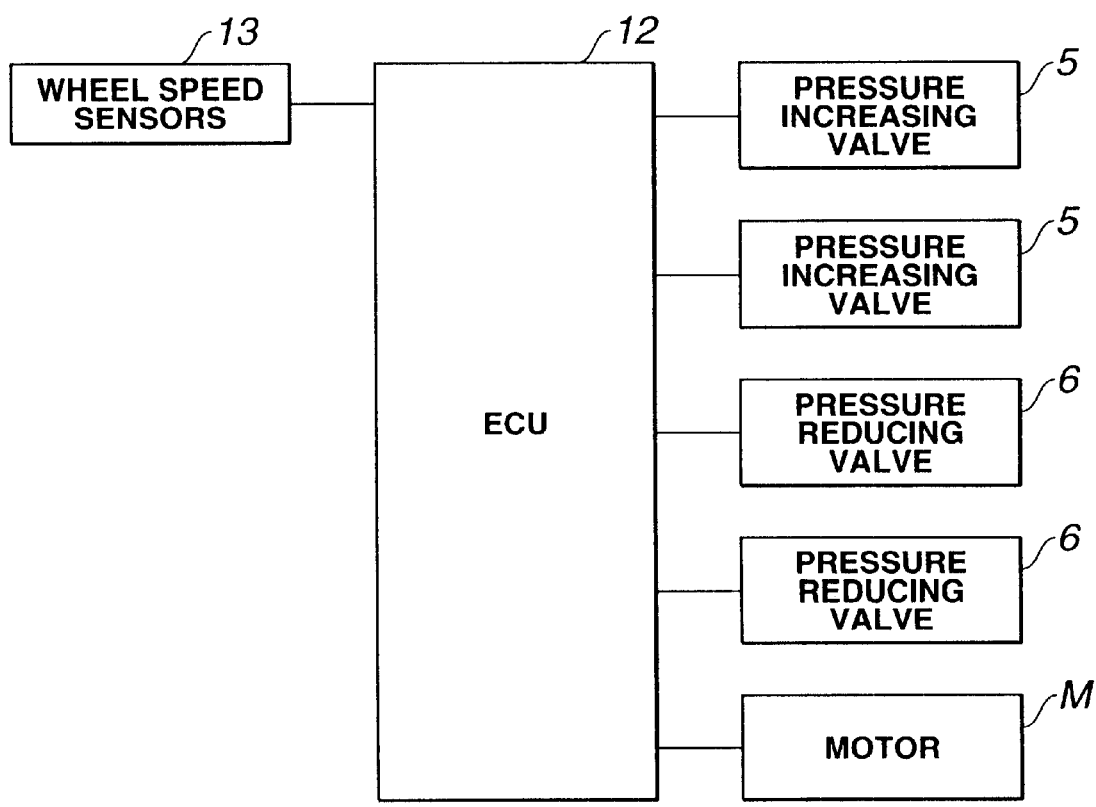
FIG. 2 is a block diagram showing an electronically control unit (ECU) in a first embodiment.

Referring to FIG. 2, this antiskid brake control is performed by an electronic control unit (ECU) 12. Specifically, ECU 12 is provided on the input side with wheel speed sensors 13 for sensing the speeds of four wheels, and on the output side with a pair of pressure increasing valves 5 and a pair of pressure reducing valves 6 arranged to correspond to the respective wheels and motor M.

Figure 3:
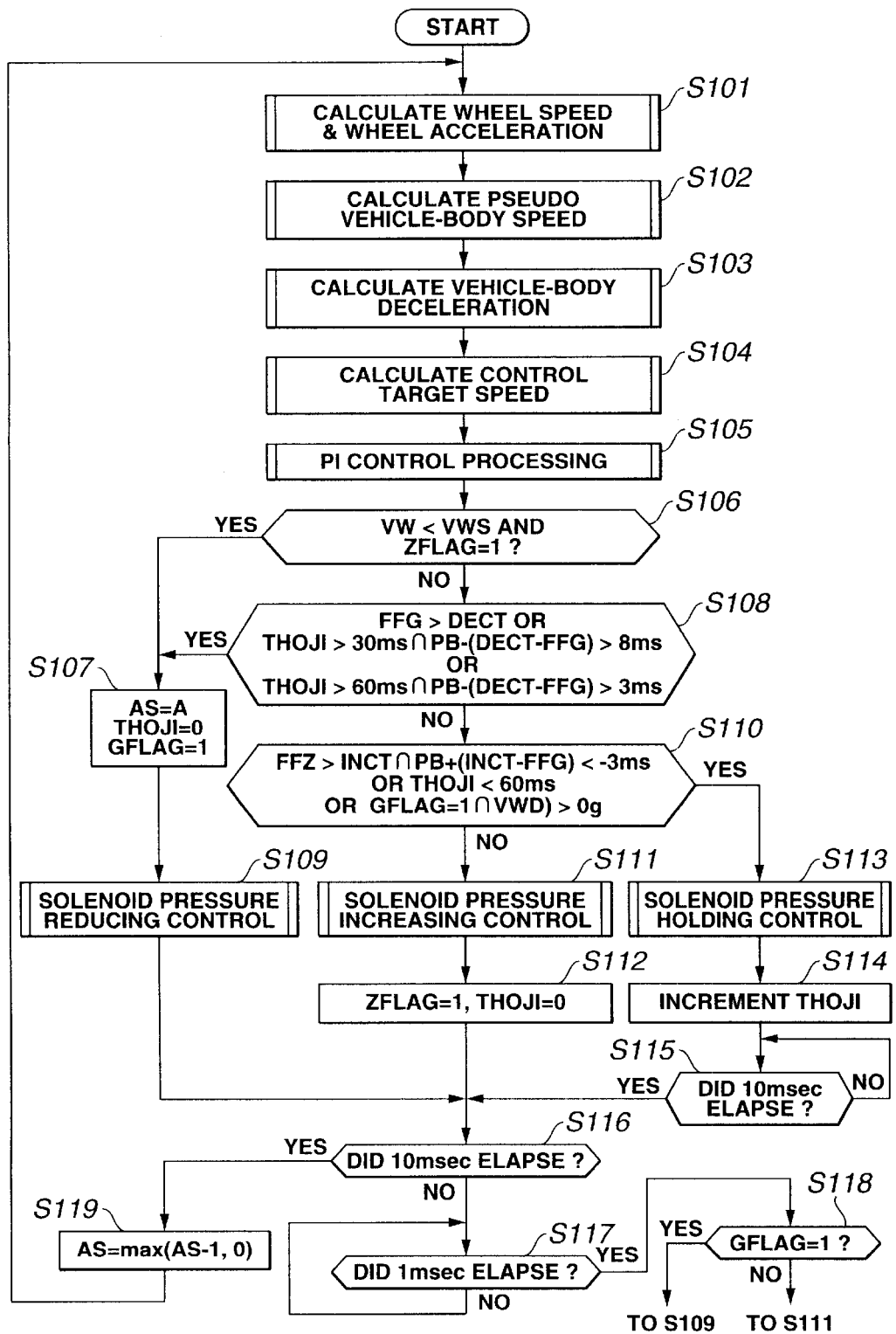
FIG. 3 is a flow chart showing flow of antiskid brake control in the first embodiment.
Figure 4:
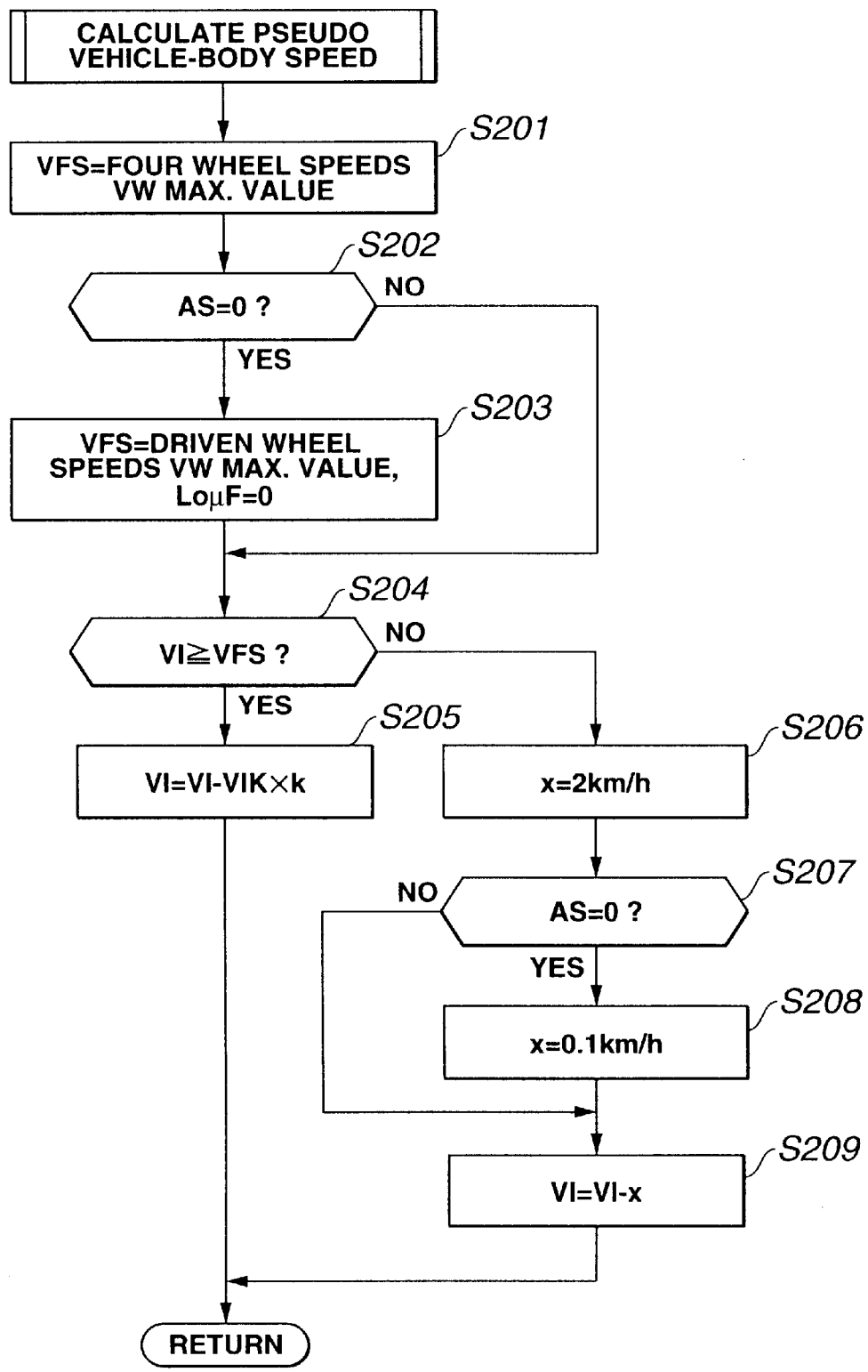
FIG. 4 is a view similar to FIG. 3, showing flow of pseudo vehicle-body speed calculation in the first embodiment.

The following explains antiskid brake control performed by ECU 12. FIG. 3 shows entire flow of antiskid brake control. This antiskid brake control is executed in a cycle of 10 msec. First, at a step S101, the sensor frequency is obtained from the sensor pulse number of each wheel speed sensor 13 which is generated every 10 msec and the cycle thereof to calculate wheel speed Vw and wheel acceleration ΔVw. In the following description or on the drawings, numeral FR, FL, RR, or RL added after a numeral Vw, ΔVw, or the like indicates the wheel speed or wheel acceleration of the respective wheel. And a numeral "xx" added indicates either one of numerals FR, FL, RR, and RL or any of the wheels.

At a step S102, a pseudo vehicle-body speed VI is calculated in accordance with wheel speed Vw. The details of calculation of pseudo vehicle-body speed VI will be described later. At a step S103, a vehicle-body deceleration VIK is calculated in accordance with the rate of change of pseudo vehicle-body speed VI. The method of obtaining vehicle-body deceleration VIK will be described later. At a step S104, a target wheel speed VWM is calculated. The details of calculation of target wheel speed VWM will be described later. At a step S105, proportional integral (PI) control processing is carried out to obtain a target fluid pressure PB. The details of this PI control will be described later.

At a step S106, it is determined whether or not wheel speed VW is lower than an optimum slip ratio VWS or a start determination threshold value for pressure reducing control and whether or not a pressure increase flag ZFLAG as will be described later is 1 which indicates pressure increasing control. If the answer is YES or it is determined that VW<VWS and ZFLAG=1, flow proceeds to a step S107, whereas if the answer is NO, flow proceeds to a step S108. At step S107, an antiskid timer AS is set at A which indicates that antilock braking system (ABS) control is carried out, a pressure hold timer THOJI is set at zero which indicates that pressure hold is carried out, and a pressure reduction flag GFLAG is set at 1 which indicates that pressure reducing control is carried out. Then, flow proceeds to a step S109 where pressure reducing control is carried out. In this pressure reducing control, a duty signal is output to pressure reducing valve 6 to control the valve opening amount, controlling thereby the pressure reduction amount.

At step S106, if the answer is NO, flow proceeds to a step S108 where it is determined whether or not any of the following three conditions is satisfied. If it is determined that any of three is satisfied, flow proceeds to step S107 where pressure reducing control is carried out, whereas if it is determined that none is satisfied, flow proceeds to a step S110 where pressure increase/hold determination is made. The three conditions at step S108 are: 1) a feedforward pressure reduction amount FFG is larger than a pressure reduction timer DECT; 2) a value of pressure hold timer THOJI is greater than 30 msec, and a value of PB−(DECT−FFG) is greater than 8 msec; and 3) pressure hold timer THOJI is greater than 60 msec, and a value of PB−(DECT−FFG) is greater than 3 msec, wherein PB is a current target fluid pressure, and DECT is a pressure reduction timer or integral value of the pressure reduction processing time. That is, flow proceeds to pressure reducing control when 1) pressure reduction counter DECT is smaller than feedforward pressure reduction amount FFG; 2) target fluid pressure PB exceeds 8 msec while 30 msec pressure hold is carried out after execution of a feedforward pressure reduction as will be described later; or 3) target fluid pressure PB exceeds 3 msec when 60 msec pressure hold is carried out, wherein target fluid pressure PB is multiplied by a coefficient K as will be described later for conversion into the opening time of pressure reducing valve 6.

At step S110, pressure increase/hold determination is made in accordance with whether or not any of the following three conditions is satisfied. If any of the three is satisfied, flow proceeds to a step S113 for pressure holding control, whereas if none is satisfied, flow proceeds to a step S111 for pressure increasing control. The three conditions are: 1) FFZ≦INCT and PB+(INCT−FFZ)<−3 msec; 2) THOJI<60 msec; and 3) GFLAG=1 and VWD>0 g, wherein FFZ is a feedforward pressure increase amount as will described later, and INCT is a pressure increase timer or integral value of the pressure increasing control time. In the case of pressure increase, both pressure increase timer INCT and feedforward pressure increase amount FFZ are given as negative values. That is, flow proceeds to pressure increasing control when pressure increase timer INCT is smaller than feedforward pressure increase amount FFZ, or when wheel acceleration VWD exceeds 0 g after execution of 60 msec pressure hold or during pressure reducing control.

After step S111 for execution of pressure increasing control, flow proceeds to a step S112 where pressure increase flag ZFLAG is set at 1, and pressure hold timer THOJI is set to zero. After step S113 for execution of pressure holding control, flow proceeds to a step S114 where pressure hold timer THOJI is incremented by 1. At a subsequent step S115, it is determined whether or not 10 msec has elapsed. If it is determined that 10 msec has elapsed, flow proceeds to a step S116, whereas if it is determined that 10 msec has not elapsed, processing at step S115 is repeatedly carried out up to a lapse of 10 msec.

At step S116, in the way similar to step S115, it is determined whether or not 10 msec has elapsed. Specifically, after step S109 for execution of pressure reducing control or step S111 for execution of pressure increasing control, flow proceeds to step S116. If it is determined that 10 msec has not elapsed, flow proceeds to a step S117 where it is determined whether or not 1 msec has elapsed. If it is determined that 1 msec has elapsed, flow proceeds to a step S118 where it is determined whether or not GFLAG is equal to 1. If it is determined that GFLAG=1 (pressure reducing control), flow returns to step S109, whereas if it is determined that GFLAG≠1 (pressure increasing control), flow proceeds to step S111. That is, in the case of pressure reducing control or pressure increasing control, processing at step S109 or S111 is carried out every 1 msec. And after a lapse of 10 msec, flow proceeds to a step S119 where larger one of a value obtained by subtracting 1 from antiskid timer AS and zero is selected as new antiskid timer AS, then, flow returns to step S101.

Figure 5:
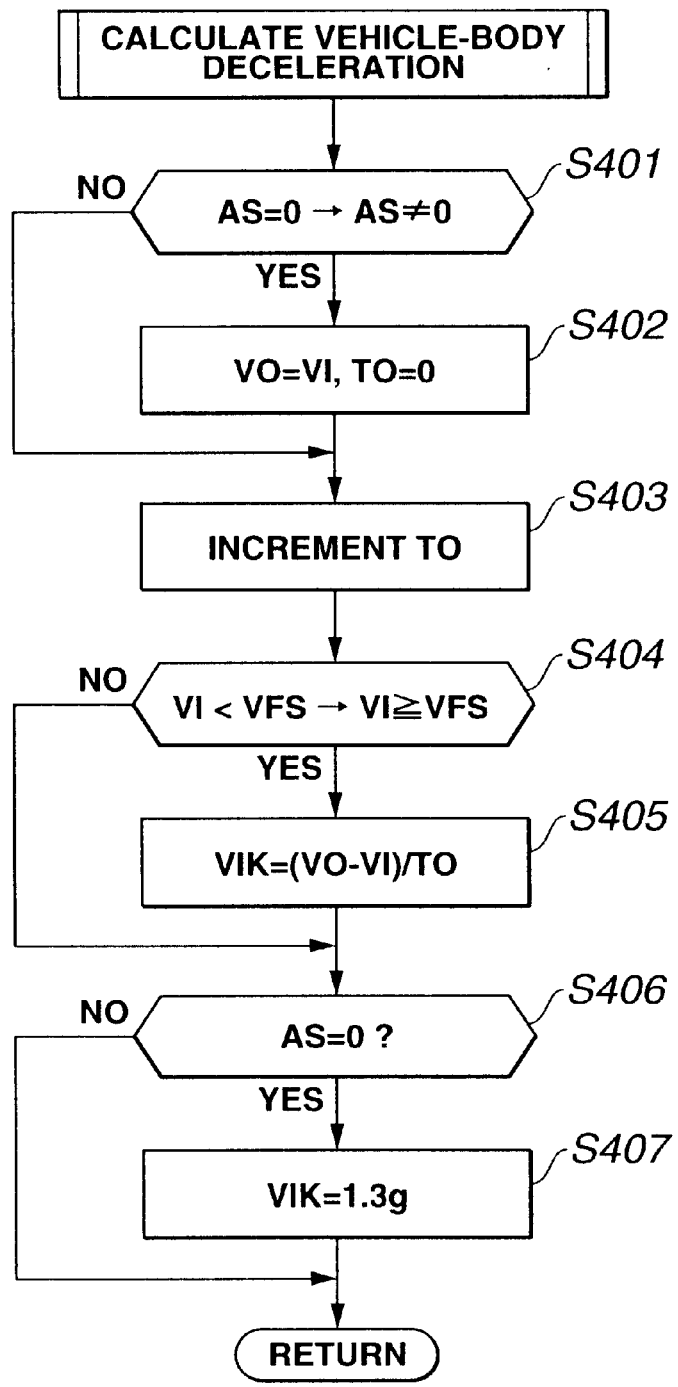
FIG. 5 is a view similar to FIG. 4, showing flow of vehicle-body deceleration calculation in the first embodiment.

Referring next to FIG. 5, the details of the pseudo vehicle-body speed calculation at step S102 in FIG. 3 will be explained. First, at a step S201, the highest wheel speed of four wheel speeds VW is set as a control wheel speed VFS. At a step S202, if it is determined whether or not antiskid timer AS is equal to zero, i.e. pressure reducing control is completed. If it is determined that AS=0, i.e. a pressure reduction is not completed, flow proceeds to a step S203, whereas if it is determined that AS≠0, i.e. a pressure reduction is completed, flow proceeds to a step S204. At step S203, the control wheel speed VFS is set at larger one of wheel speeds VWRR and VWRL of the driven rear wheels, and a low-$\mu$ flag Lo$\mu$F which indicates determination of a low-$\mu$ road is reset to zero.

At step S204, it is determined whether or not pseudo vehicle-body speed VI is equal to or greater than control wheel speed VFS. If the answer is YES or VI≧VFS, flow proceeds to a step S205 where pseudo vehicle-body speed VI is obtained in accordance with vehicle-body deceleration VIK and using an operation expression of VI=VI−(VIK)×k. If the answer is NO or it is determined that VI<VFS, flow proceeds to a step S206 and subsequent where pseudo vehicle-body speed VI is obtained otherwise without relying on vehicle-body deceleration VIK. At step S206, a constant "x" to be used for operation is set at 2 km/h, and at a subsequent step S207, it is determined whether or not antiskid timer AS is equal to zero, i.e. a pressure reduction is completed. If it is determined that AS=0, flow proceeds to a step S208 where constant "x" is set at a small value such as 0.1 km/h. A subsequent step S209, pseudo vehicle-body speed VI is obtained by the operation of VI=VI−x. That is, preferably, when a pressure reduction causes wheel speed VW to return to pseudo vehicle-body speed VI, or to then exceed a spin-up point or point leaving pseudo vehicle-body speed VI or its neighborhood, pseudo vehicle-body speed VI is obtained in accordance with vehicle-body deceleration VIK. Then, when a pressure reduction causes wheel speed VW to return to the actual vehicle-body speed so as to have thereby wheel speed VFS exceeding pseudo vehicle-body speed VI, the operation is carried out in accordance with a fixed value and not vehicle-body deceleration VIK until the spin-up point is obtained. Processing at step S208 functions as a limiter operating when control wheel speed VFS has a value extremely larger than pseudo vehicle-body speed VI.

Referring next to FIG. 5, vehicle-body deceleration calculation at step S103 in FIG. 3 will be explained. First, at a step S401, it is determined whether or not a value of antiskid timer AS is changed from AS=0 to AS≠0, i.e. antiskid brake control is started. If it is determined that AS=0→AS≠0, i.e. antiskid brake control is started, flow proceeds to a step S402 where pseudo vehicle-body speed VI at that time is set as an operation reference value V0, and an operation reference timer T0 is reset to zero. If it is determined that AS=0, i.e. antiskid brake control is not started, flow proceeds to a step S403.

At step S403, operation reference timer T0 is incremented by 1. Then, at a step S404, it is determined whether or not pseudo vehicle-body speed VI is changed from a value smaller than control wheel speed VFS to a value equal to or greater than it. That is, a pressure reduction causes wheel speed VW to rise and return to the actual vehicle-body speed. This change is determined by detecting the spin-up point where pseudo vehicle-body speed VI changes from upward to downward. Processing at step S404 is to determine whether or not the spin-up point is produced. If it is determined that the spin-up point is produced, flow proceeds to a step S405 where vehicle-body deceleration VIK is obtained in accordance with pseudo vehicle-body speed VI at that time, operation reference value V0 at an antiskid brake control start point, and operation reference timer T0 which starts measuring from the antiskid brake control start point and using the expression of VI−(V0−VI)/T0.

At a step S406, it is determined whether or not antiskid timer AS is equal to zero. If it is determined that AS=0, flow proceeds to a Step S407 where vehicle-body deceleration VIK is set at 1.3 g. That is, in the first cycle of antiskid brake control, wheel speed VW is lower than the actual vehicle-body speed, and thus the spin-up point is not produced, failing to allow the operation for obtaining vehicle-body deceleration VIK at step S405. Therefore, until the spin-up point is produced to allow the operation for obtaining the actual vehicle-body deceleration, a fixed value corresponding to high-$\mu$ road braking is used for the operation.

Figure 6:
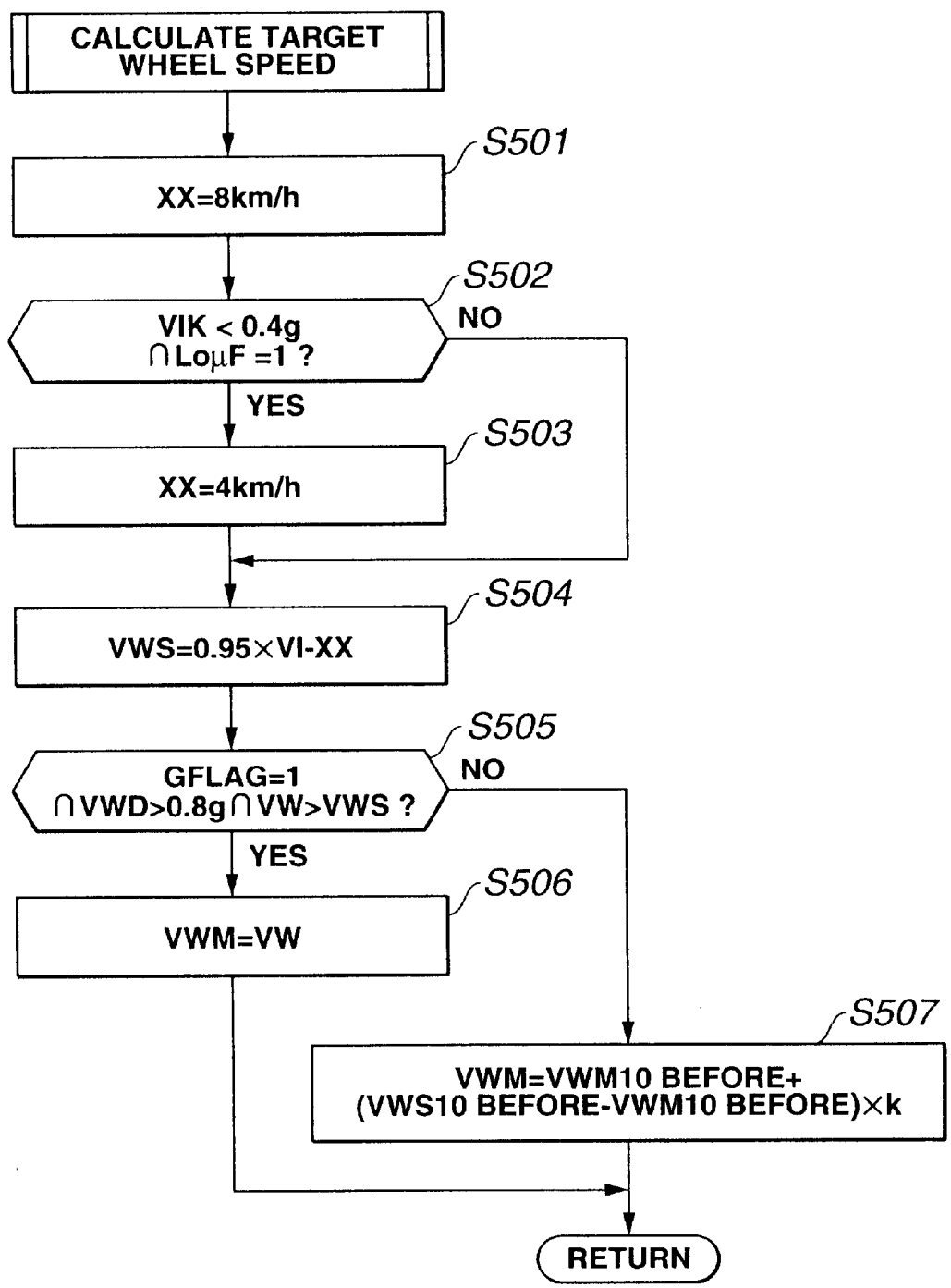
FIG. 6 is a view similar to FIG. 5, showing flow of target wheel speed calculation in the first embodiment.

Referring next to FIG. 6, the details of target wheel speed calculation at step S104 in FIG. 3 will be explained. First, at a step S501, a constant "xx" is set at 8 km/h. At a step S502, it is determined whether or not vehicle-body deceleration VIK is smaller than 0.4 g, or low-$\mu$ flag Lo$\mu$F is set at 1. If the answer is YES, i.e. the road surface is estimated to have low $\mu$, flow proceeds to a step S503 where constant "xx" is changed to 4 km/h, then, flow proceeds to a step S504. If the answer is NO, i.e. the road surface is estimated to have non-low μ, flow proceeds to a step S504 without changing constant "xx".

At step S504, optimum slip ratio value VWS is calculated using the expression of VWS=0.95×VI−xx. Optimum slip ratio value VWS indicates a wheel speed which provides the slip ratio allowing efficient achievement of braking force with respect to current pseudo vehicle-body speed VI. At a subsequent step S505, it is determined whether or not pressure reduction flag GFLAG indicative of execution of pressure reducing control is equal to 1, wheel acceleration VWD is greater than 0.8 g, and wheel speed VW is greater than optimum slip ratio value VWS. If the answer is YES, flow proceeds to a step S506 where target wheel speed VWM is set at wheel speed VW, whereas if the answer is NO, flow proceeds to a step S507 where target wheel speed VWM is obtained by calculation of VWM=VWM10 m before+(VWS10 m before−VWM10 m before)×k by means of a low-path filter of first-order lag. That is, in this embodiment, at the point where wheel acceleration VWD returns to the actual vehicle speed at greater acceleration than the predetermined value 0.8 g after execution of pressure reducing control, target wheel speed VWM is set at wheel speed VW. And from the point where wheel speed VW approaches the actual vehicle speed or reaches the neighborhood of the spin-up point, target wheel speed VWM is converged to optimum slip ratio value VWS at the first-order lag. As for a change in target wheel speed VWM, refer to FIG. 10.

Figure 7:
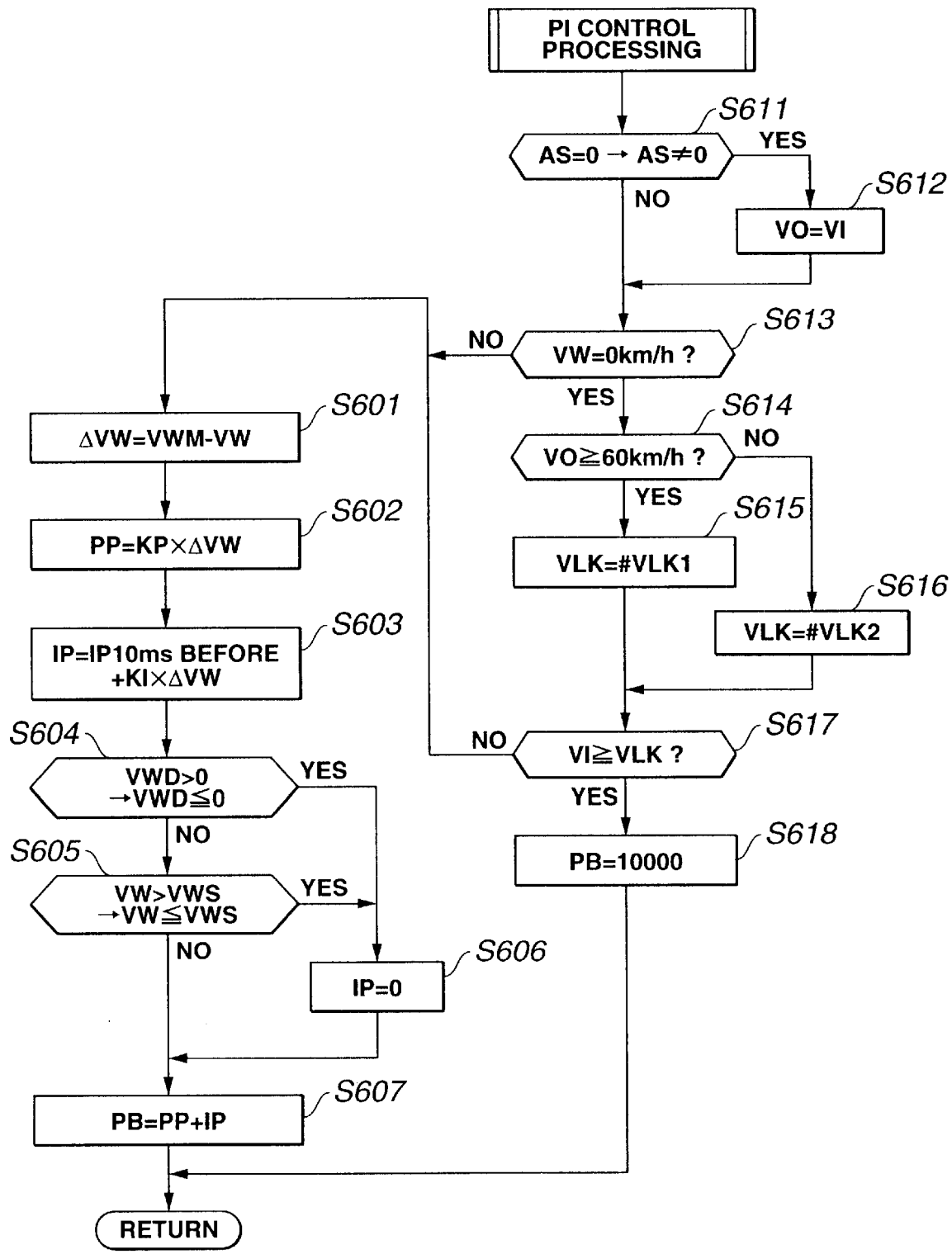
FIG. 7 is a view similar to FIG. 6, showing flow of proportional integral (PI) control processing including quick pressure reduction prohibiting control in the first embodiment.

Referring next to FIG. 7, the details of PI control processing at step S105 in FIG. 3 will be explained. In a flow chart in FIG. 7, flow from a step S611 to a step S618 is involved in determination of execution of quick pressure reduction prohibiting control described in claims. First, at step S611, it is determined whether or not control is started in accordance with changing of a value of antiskid timer AS from AS=0 to AS≠0. If it is determined that control is started, flow proceeds to step S612 where operation reference value V0 is set at pseudo vehicle-body speed VI at that time. At subsequent step S613, it is determined whether or not the wheels lock in accordance with whether wheel speed VW is 0 km/h. If it is determined that VW=0 km/h, i.e. the wheels lock, flow proceeds to step S614 where it is determined whether or not operation reference value V0 is equal to or greater than a predetermined high-speed braking determination value. The predetermined high-speed braking determination value is 60 km/h in this embodiment, alternatively, it may be between 40 and 100 km/h. If it is determined that V0≧60 m/h, flow proceeds to step S615 where a quick pressure reduction prohibiting speed VLK is set at a first quick pressure reduction prohibiting speed #VLK1, whereas if it is determined that V0<60 km/h, flow proceeds to step S616 where quick pressure reduction prohibiting speed VLK is set at a second quick pressure reduction prohibiting speed #VLK2. In this embodiment, first quick pressure reduction prohibiting speed #VLK1 is 20 km/h, and second quick pressure reduction prohibiting speed #VLK2 is 10 km/h. Alternatively, first and second quick pressure reduction prohibiting speeds #VLK1, #VLK2 may be between 10 and 30 km/h. At subsequent step S617, it is determined whether or not pseudo vehicle-body speed VI is equal to or greater than quick pressure reduction prohibiting speed VLK. If it is determined that VI≧VLK, which means that quick pressure reduction is allowed, flow proceeds to step S618 where target fluid pressure PB is set at 10000. If it is determined that VI<VLK, flow proceeds to a step S601.

At step S601, a deviation ΔVW is obtained between target wheel speed VWM and wheel speed VW. At a step S602, deviation ΔVW is multiplied by a pressure proportional gain KP to convert deviation ΔVW into the brake fluid pressure, obtaining a deviated pressure value PP. At a step S603, an integral pressure value IP is calculated using the expression of IP=IP10 m before+KI×ΔVW, wherein IP10 m before is a value before one control cycle of integral pressure value IP.

At steps S604 and S605, it is determined whether or not a value of wheel acceleration VWD is changed from VWD>0 to VWD≦0, and a value of wheel speed VW is changed from VW>VWS (optimum slip ratio value) to VW≦VWS. If the answer is YES, i.e. any change occurs, flow proceeds to a step S606 where integral pressure value IP is set at zero. At a subsequent step S607, target fluid pressure PB is obtained using PB=PP+IP. If target fluid pressure PB is a negative value, a pressure increase is carried out done, whereas if it is a positive value, a pressure reduction is carried out.

Figure 8:
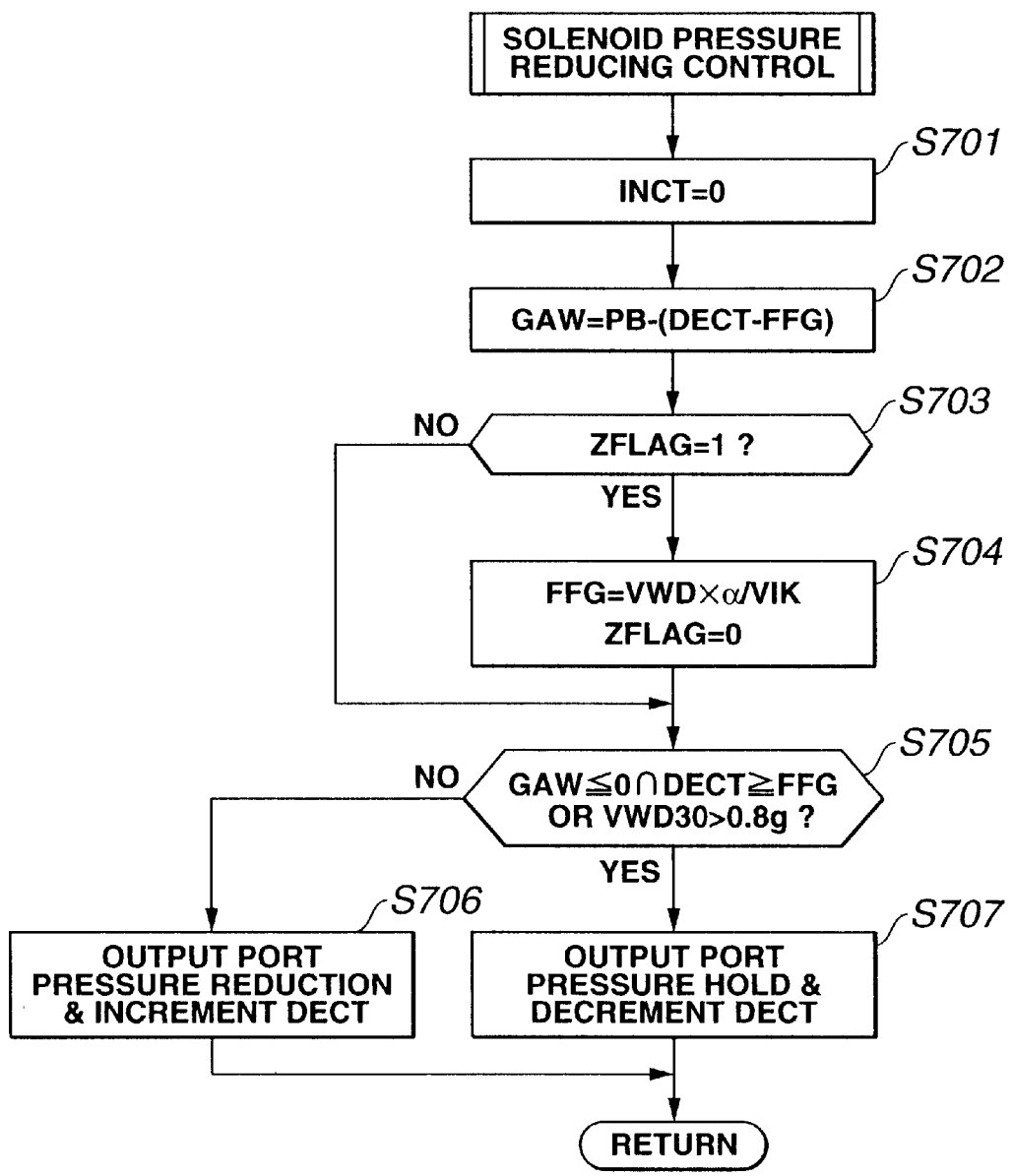
FIG. 8 is a view similar to FIG. 7, showing flow of pressure reducing control in the first embodiment.

Referring next to FIG. 8, the details of solenoid pressure reducing control at step S110 in FIG. 5 will be explained. At a step S701, pressure increase timer INCT is reset to zero, and feedback pressure increase amount FFZ is reset to zero. At a step S702, a pressure reduction time GAW is obtained using the expression of GAW=PB−(DECT−FFG). Thus, if PB is set at 10000 at step S618, pressure reduction time GAW is a value corresponding to quick pressure reduction. At a step S703, it is determined whether or not pressure increase flag ZFLAG is set at 1, i.e. it is first pressure reducing control. If it is determined that ZFLAG=1 and it is the first pressure reduction, flow proceeds to a step S704, whereas if ZFLAG≠1, flow proceeds to a step S705 without carrying out processing at step S704. At step S704, feedback pressure reduction amount FFG is obtained using the expression of FFG=VWD×α/VIK, and ZFLAG is reset to zero, wherein the first pressure reduction amount is obtained in accordance with wheel acceleration VWD, which is referred to as feedforward pressure reduction amount in the description.

At step S705, it is determined whether or not any of the following two conditions is satisfied. If it is determined that any of the two is satisfied, flow proceeds to a step S707 where a pressure hold output is carried out, whereas if none is satisfied, flow proceeds to a step S706 where a pressure reduction output is carried out, and pressure reduction timer DECT is incremented by 1. The two conditions at step S705 are: 1) pressure reduction time GAW is equal to or smaller than zero, and pressure reduction timer DECT is equal to or greater than feedforward pressure reduction amount FFG; and 2) wheel acceleration VWD is greater than 0.8 g. Specifically, in first pressure reducing control, a pressure reduction output is carried out until pressure reduction timer DECT exceeds the feedforward pressure reduction amount FFG. On the way or thereafter, if wheel acceleration VWD becomes greater than 0.8 g and returns to the vehicle speed, a pressure reduction output is canceled to carry out a pressure hold output. After execution of the output of first feedforward pressure reduction amount FFG, the output is carried out by only a difference from previous target fluid pressure PB, the details of which will be described later.

Figure 9:
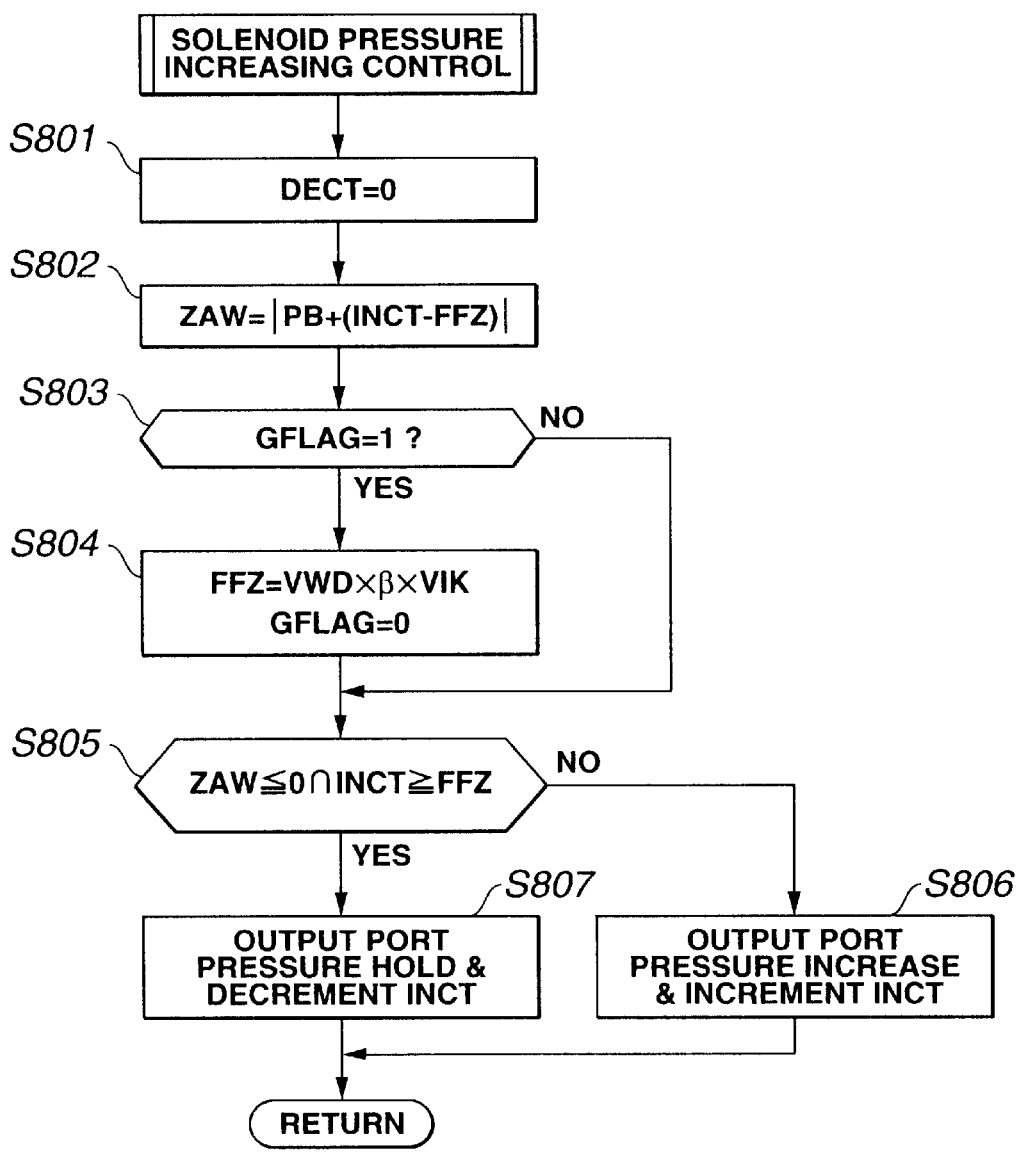
FIG. 9 is a view similar to FIG. 8, showing flow of pressure increasing control in the first embodiment.

Referring to FIG. 9, the details of solenoid pressure increasing control at step S111 in FIG. 3 will be explained. First, at a step S801, pressure reduction counter DECT for measuring a duration of execution of pressure reducing control is reset to zero, and feedback pressure reduction amount FFG is reset to zero. At a step S802, pressure increase time ZAW, which corresponds to an ON pulse width in claims, is obtained using the expression of ZAW= |PB+(INDT−FFZ)|. At a step S803, it is determined whether or not pressure reduction flag GFLAG is set at 1, i.e. it is first pressure increasing control. If it is determined that GFLAG=1 and it is first pressure increase, flow proceeds to a step S804, whereas if it is determined that GFLAG≠1, flow proceeds to a step S805 without carrying out processing at step S804. At step S804, feedforward pressure increase amount FFZ is obtained using the expression of FFZ= VWD×β/VIK, and GFLAG is reset to zero, wherein first pressure increase amount is obtained in accordance with wheel acceleration VWD, which is referred to as feedforward pressure increase amount in the description.

At step S805, it is determined whether or not pressure increase time ZAW is equal to or smaller than zero, pressure increase timer INCT is equal to or greater than feedforward pressure increase amount FFZ. If the answer is YES, flow proceeds to a step S807 where a pressure hold output is carried out, whereas if the answer is NO, flow proceeds to a step S806 where a pressure increase output is carried out, and pressure increase timer INCT is incremented by 1. Specifically, in first pressure increasing control, a pressure increase output is carried out until pressure increase timer INCT exceeds feedforward pressure increase amount FFZ. Thereafter, the output is carried out when pressure increase time ZAW becomes positive.

Figure 10:
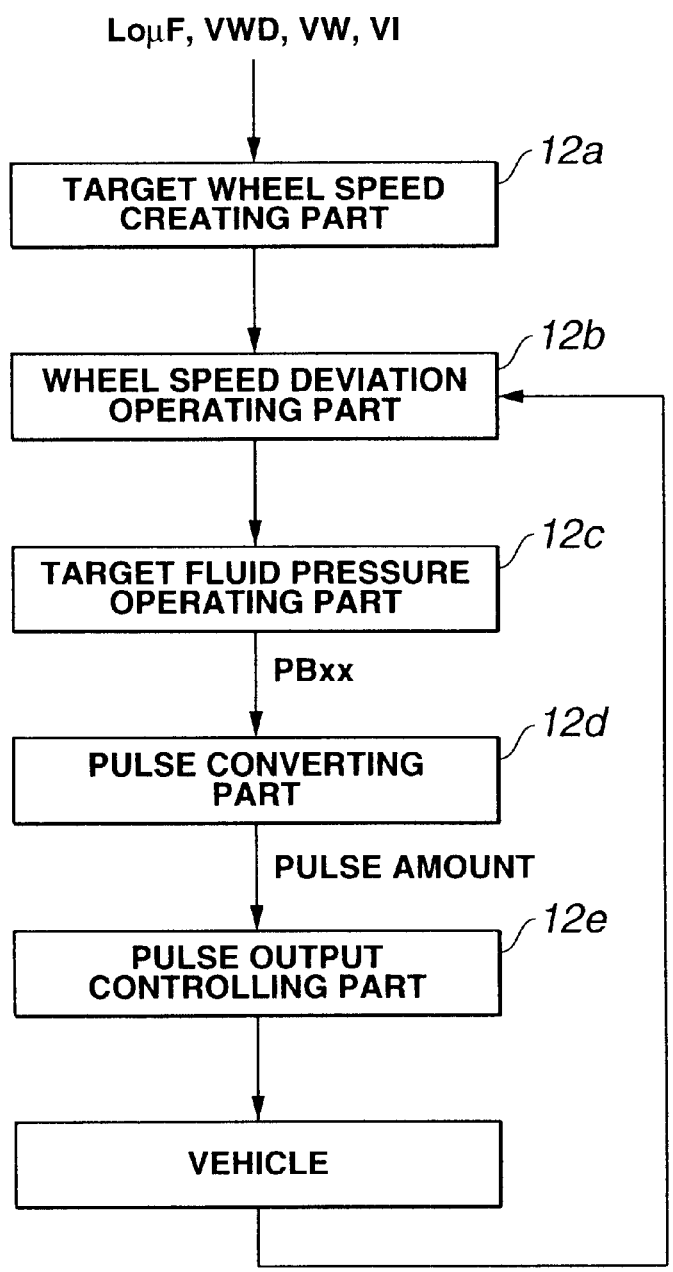
FIG. 10 is a view similar to FIG. 2, showing the main parts of the antiskid brake control system.

FIG. 10 shows parts of ECU 12 for carrying out antiskid brake control. Referring to FIG. 10, a target wheel speed creating part 12a, which is a part for performing processing at step S104, creates target wheel speed VWM by entering pseudo vehicle-body speed VI, vehicle-body deceleration VIK, wheel speed VW, and wheel acceleration VWD, and comprises a first-order low-pass filter. Target wheel speed VWM as created is input to wheel speed deviation operating part 12b to obtain deviation ΔVW, processing of which is carried out at step S601 in FIG. 7. Target fluid pressure operating part 12c calculates deviated pressure value PP and integral pressure value IP in accordance with deviation ΔVW, in accordance with which target fluid pressure PB is obtained, and processing of which is carried out at steps S602 to S607 in FIG. 7. Target fluid pressure PB is converted into pulses in pulse converting part 12d, which is output from pulse output controlling part 12e. Pulse converting part 12d and pulse output controlling part 12e correspond to steps S106 to S119 in FIG. 3, whereby duty signals are output having ON pulse width corresponding to pressure reduction time GAW and pressure increase time ZAW obtained in accordance with target fluid pressure PB.

Figure 11:
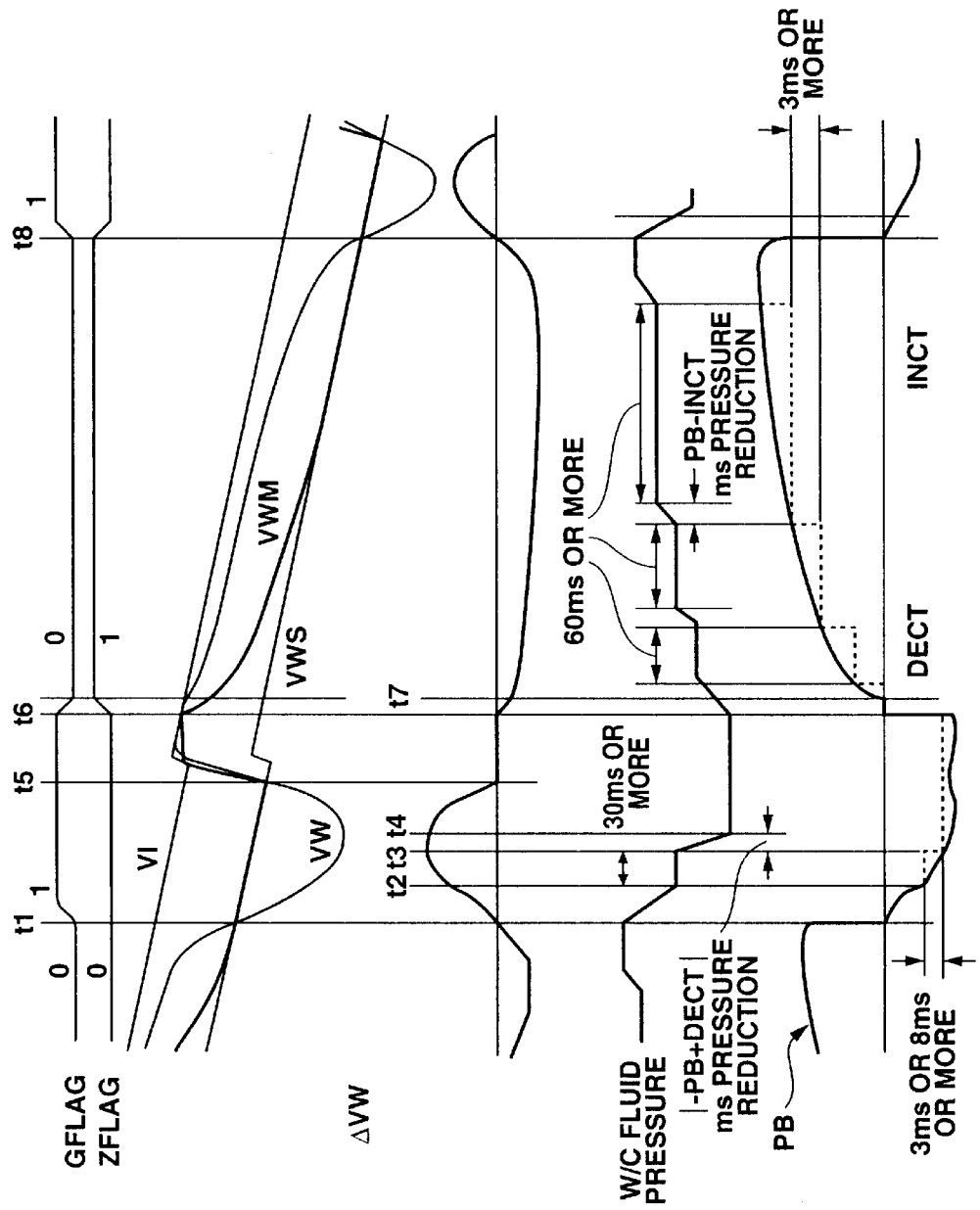
FIG. 11 is a time chart showing an example of operation of the first embodiment.

Referring to FIG. 11, a fundamental operation of this embodiment will be explained. As shown in FIG. 11, with a reduction in pseudo vehicle-body speed VI due to braking, target wheel speed VWM is formed in such as way as to converge to optimum slip ratio value VWS from a value equal to wheel speed VW. The value of target wheel speed VWM equal to wheel speed VW is a value in the neighborhood of a point where wheel speed VW changes from upward to downward, and is equivalent to the wheel speed (≈vehicle-body speed) in the neighborhood of the spin-up point.

As seen in FIG. 11, if wheel speed VW becomes smaller than optimum slip ratio value VWS with antiskid brake control not started (point t1), the pressure reducing control is started along flow of step S106→step S107→step S109. In first pressure reducing control, feedforward pressure reduction amount FFG is determined in accordance with wheel acceleration VWD and vehicle-body deceleration VIK along flow of step S701→step S702→step S703→step S704. And pressure reduction output is made along flow of step S705→step S706. This pressure reduction output is carried out until pressure reduction counter DECT reaches feedforward pressure reduction amount FFG. In the time chart in FIG. 11, pressure reduction counter DECT reaches feedforward pressure reduction amount FFG at a point t2, at which pressure holding control is carried out along flow of step S106→step S108→step S110→step S113. As seen in FIG. 11, if deviation ΔVW is produced between target wheel speed VWM and wheel speed VW even after point t2, target fluid pressure PB also increases which is formed by totalizing deviation ΔVW at PI control processing at step S105. As for target fluid pressure PB, if a value obtained by subtracting a portion of feedforward pressure reduction amount FFG exceeds 8 msec when 30 msec pressure hold is carried out from point t2 or exceeds 8 msec between 30 and 60 msec, a pressure reduction output is made; or if the value exceeds 3 msec when 60 msec pressure hold is completed from point t2 or exceeds thereafter 3 msec, a pressure reduction output is made. This pressure reduction output is carried out for pressure reduction time GAW obtained in accordance with target fluid pressure PB at step S702. This is a pressure reduction output provided between a point t3 and a point t4 as shown in FIG. 11 and forms a slow pressure reduction output. Specifically, second and subsequent pressure reduction output or slow pressure reduction output is carried out after a lapse of at least 30 msec from the first output. In this case, the output is carried out when a value of pressure reduction time GAW becomes greater than 8 msec. Before a lapse of 60 msec, a pressure reduction output is made when pressure reduction time GAW exceeds 8 msec. When pressure reduction time GAW is relatively short, a pressure reduction output is carried out when pressure reduction time GAW exceeds 3 msec after a lapse of 60 msec.

Figure 12:
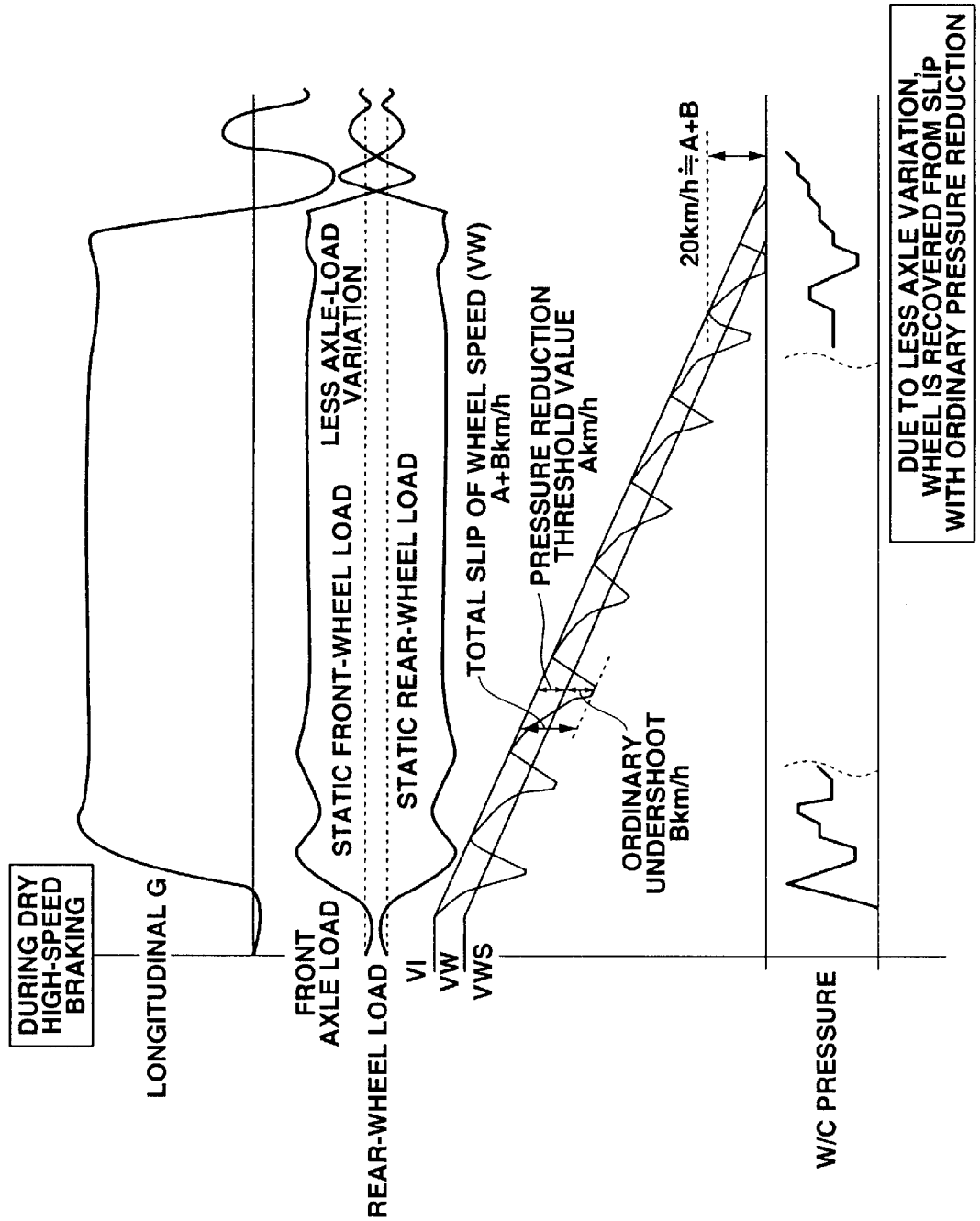
FIG. 12 is a view similar to FIG. 11, showing an example of braking at high speed in the first embodiment.
Figure 13:
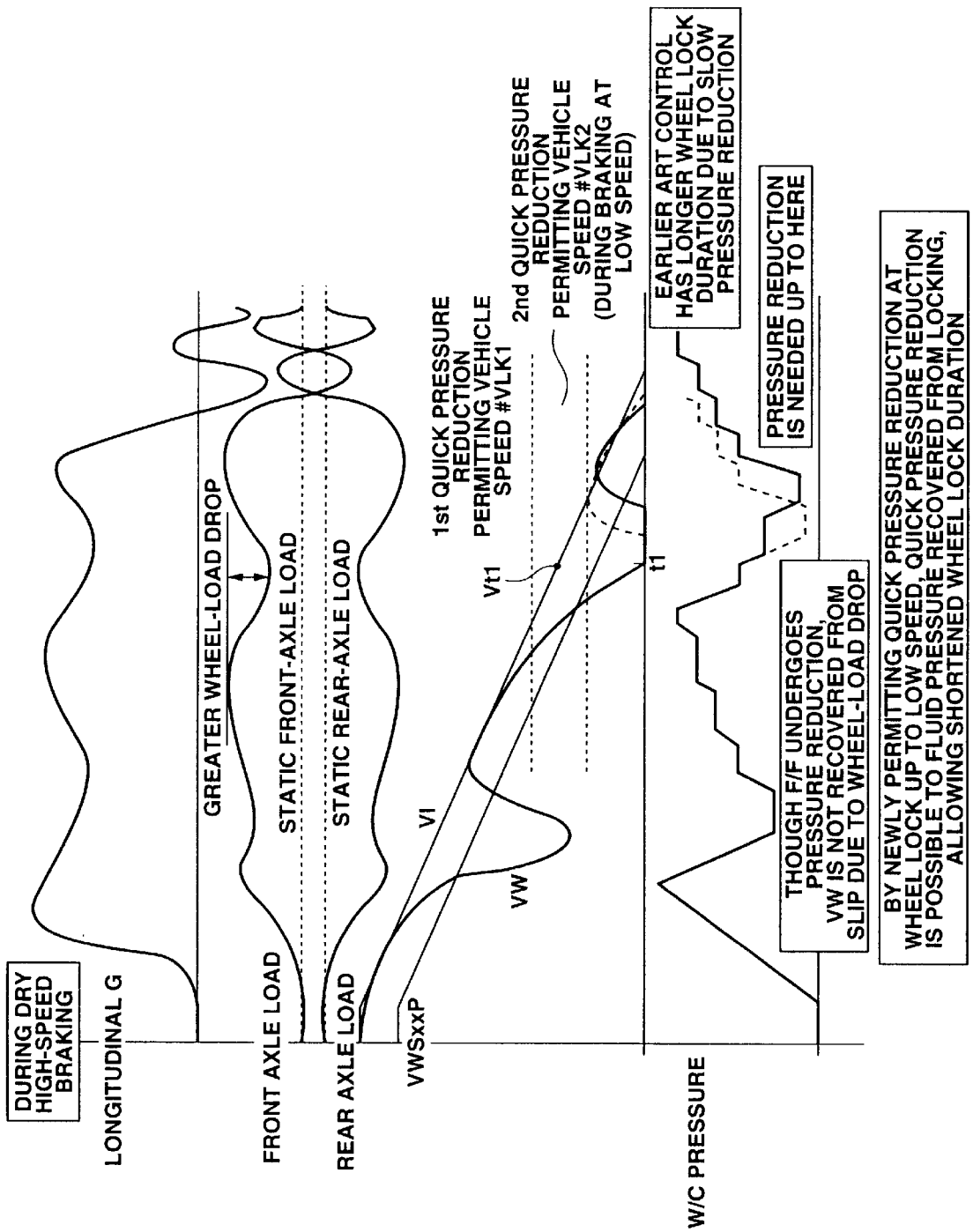
FIG. 13 is a view similar to FIG. 12, showing an example of braking at low speed in the first embodiment.
Figure 14:
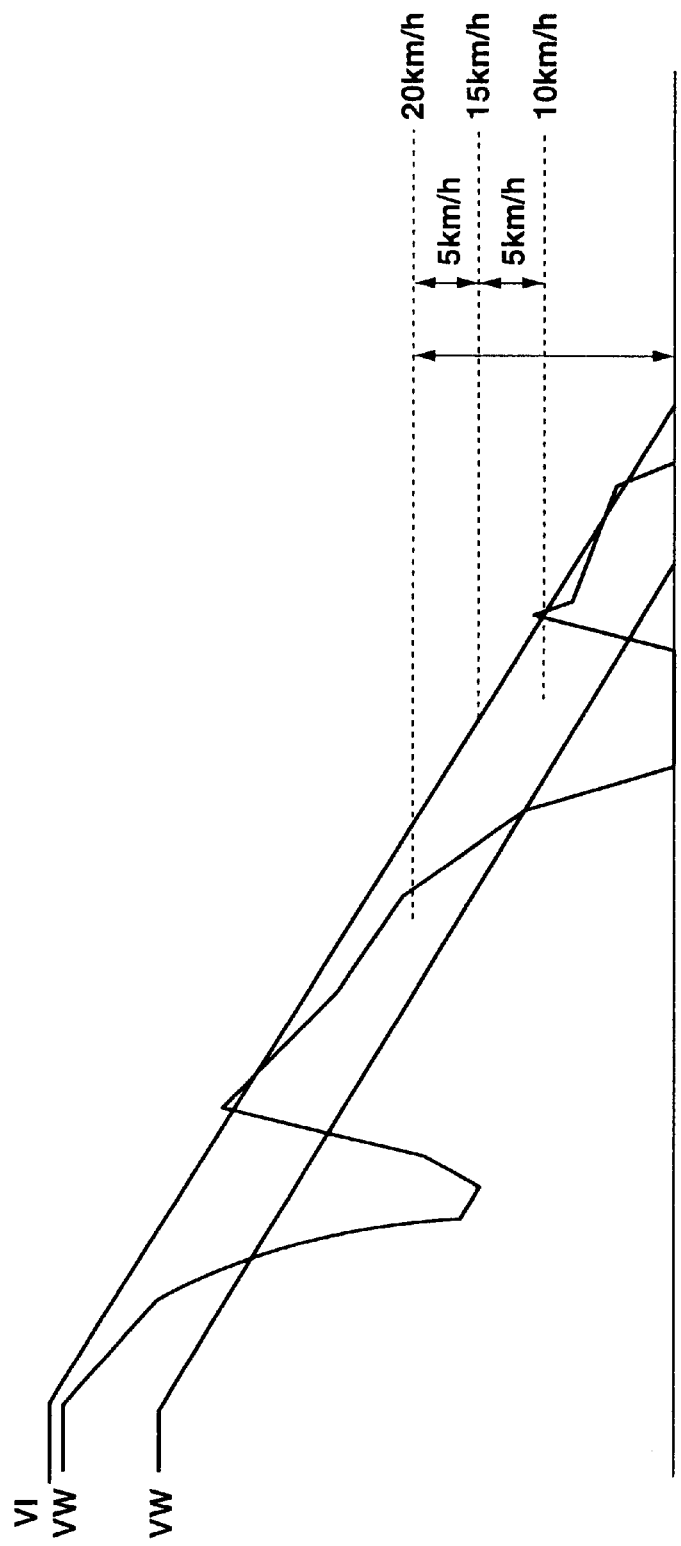
FIG. 14 is a diagrammatic drawing explaining operation of the first embodiment.

Referring next to FIGS. 12–14, quick pressure reduction prohibiting control, which is a feature of this embodiment, will be explained. FIG. 12 shows an example of control when braking is made at high speed on a dry road to start pressure reducing control at 60 km/h or higher. When pressure reducing control is started at 60 km/h or higher in such a way, operation reference value V0 is set at pseudo vehicle-body speed VI≧60 km/h in accordance with flow of step S611→step S612. If the wheels lock in this state, therefore, first quick pressure reduction prohibiting speed #VLK1 is set at 20 km/h as quick pressure reduction prohibiting speed VLK in accordance with flow of step S613→step S614→step S615. Thus, only when pseudo vehicle-body speed VI is higher than first quick pressure reduction prohibiting speed #VLK1, target fluid pressure PB is set at 10000 at the time of wheel lock, carrying out a quick pressure reduction.

In the example shown in FIG. 12, a quick pressure reduction is not made when pseudo vehicle-body speed VI is 20 km/h or higher because wheel lock does not occur. On the other hand, in the example, wheel lock occurs when pseudo vehicle-body speed VI is lower than 20 km/h. That is, wheel speed VW may decrease by a value of A+B, wherein A is a difference between pseudo vehicle-body speed VI and optimum slip ratio value VWS equal to a conventional pressure reduction threshold value, and B is an undershoot with respect to optimum slip ratio value VWS. The value A+B is determined in accordance with setting of optimum slip ratio value VWS and the pressure increasing characteristic of the braking device. In this embodiment, therefore, due to the value A+B being about 20 km/h, first quick pressure reduction prohibiting speed #VLK1 is set at 20 km/h. That is, when pseudo vehicle-body speed VI is 20 km/h or higher, wheel lock may not occur ed even if wheel speed VW undershoots, while when pseudo vehicle-body speed VI is lower than 20 km/h, wheel lock may occur when wheel speed VW undershoots as shown in FIG. 12.

In this embodiment, a quick pressure reduction is prohibited when pseudo vehicle-body speed VI is lower than 20 km/h even if wheel lock occurs. Therefore, the brake fluid amount to be discharged to reservoir 7 can be restrained, resulting in restraint of the required capacity of pump 4 and prevention of the driver from having a unfavorable G lowering feel. In this case, though wheel lock occurs, the vehicle behavior will not become unstable because pseudo vehicle-body speed VI is already decreased.

Referring next to FIG. 13, an example of control will be explained when braking is started at low speed on a dry road to start pressure reducing control at 60 km/h or lower. When pressure reducing control is started at 60 km/h or lower in such a way, operation reference value V0 is set at pseudo vehicle-body speed VI<60 km/h in accordance with flow of step S611→step S612. Thus, as shown in FIG. 13, when the wheels lock at point t1, second quick pressure reduction prohibiting speed #VLK2 is set at 10 km/h as quick pressure reduction prohibiting speed VLK in accordance with flow of step S613→step S614→step S616. Pseudo vehicle-body speed Vt1 at this point t1 is lower than first quick pressure reduction prohibiting speed #VLK1, but higher than second quick pressure reduction prohibiting speed #VLK2, thus carrying out a quick pressure reduction. Referring to FIG. 13, this results in faster returning of wheel speed VW as shown in the broken line as compared with returning of wheel speed VW when a quick pressure reduction is prohibited as shown in the solid line, obtaining shortened wheel lock duration. When a quick pressure reduction is carried out in such a way, the brake fluid amount discharged to reservoir 7 increases. In this case, since braking is started at low speed, the pressure reduction duration so far made is short, i.e. the amount of brake fluid which has been discharged to reservoir 7 is small, and the total amount thereof to be discharged to the reservoir 7 is small. This leads to no enlargement of the required capacity of pump 4, allowing reduced size of pump 4, resulting in a reduction in manufacturing cost and system size. The execution of such quick pressure reduction causes the driver to have a unfavorable G lowering feel. Moreover, during braking at low speed, load variations may occur in the low-speed area to increase the frequency of occurrence of wheel lock. Thus, in this case, though the vehicle speed is low, the vehicle behavior may become unstable. For that reason, the wheel lock duration is shortened to stabilize the vehicle behavior.

In this embodiment, second quick pressure reduction prohibiting speed #VLK2 is set at 10 km/h. This is to prohibit a quick pressure reduction when pseudo vehicle-body speed VI is lower than 15 km/h, thus not only preventing the driver from having a unfavorable G lowering feel, but also shortening the braking distance in the low-speed area. For that reason, as shown in FIG. 14, in consideration of the difference of 5 km/h and the undershoot of 5 km/h with respect to first quick pressure reduction prohibiting speed #VLK1, second quick pressure reduction prohibiting speed #VLK2 is set at 10 km/h.

Figure 15:
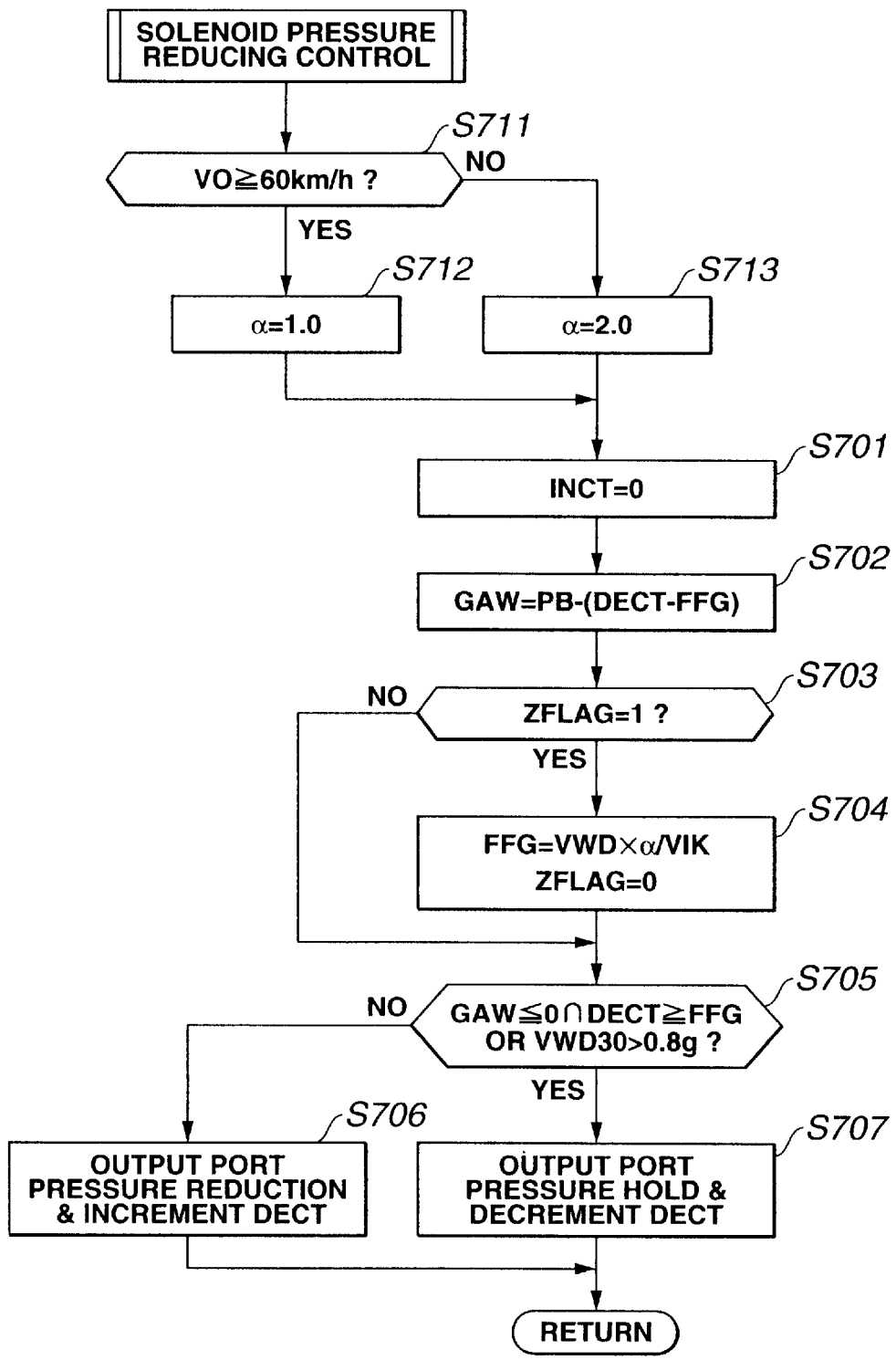
FIG. 15 is a view similar to FIG. 9, showing a second embodiment of the present invention.

Referring to FIG. 15, the second embodiment of the present invention will be explained. The second embodiment is a variation of the first embodiment, and is different from the first embodiment in part of flow of solenoid pressure reducing control at step S109. The following description is merely involved in such difference.

In this solenoid pressure reducing control, at a step S711, it is determined whether or not operation reference value V0 or pseudo vehicle-body speed VI at the start of execution of pressure reducing control is equal to or greater than 60 km/h which is a high-speed braking determination value. If it is determined that V0≧60 km/h, flow proceeds to a step S712 where a is set at 1.0, whereas if it is determined that V0<60 km/h, flow proceeds to a step S713 where α is set at 2.0. α is a coefficient for determining feedforward pressure reduction amount FFG at a step S704, wherein during low-speed braking where pressure reducing control is started at lower than 60 km/h which is a high-speed braking determination value, feedforward pressure reduction amount FFG is set at a larger value as compared with during high-speed braking where pressure reducing control is started at 60 km/h or higher. Therefore, during low-speed braking where wheel lock is apt to occur due to load variations, the first pressure reduction amount is controlled more as compared with during high-speed braking, allowing prevention wheel lock.

Figure 16:
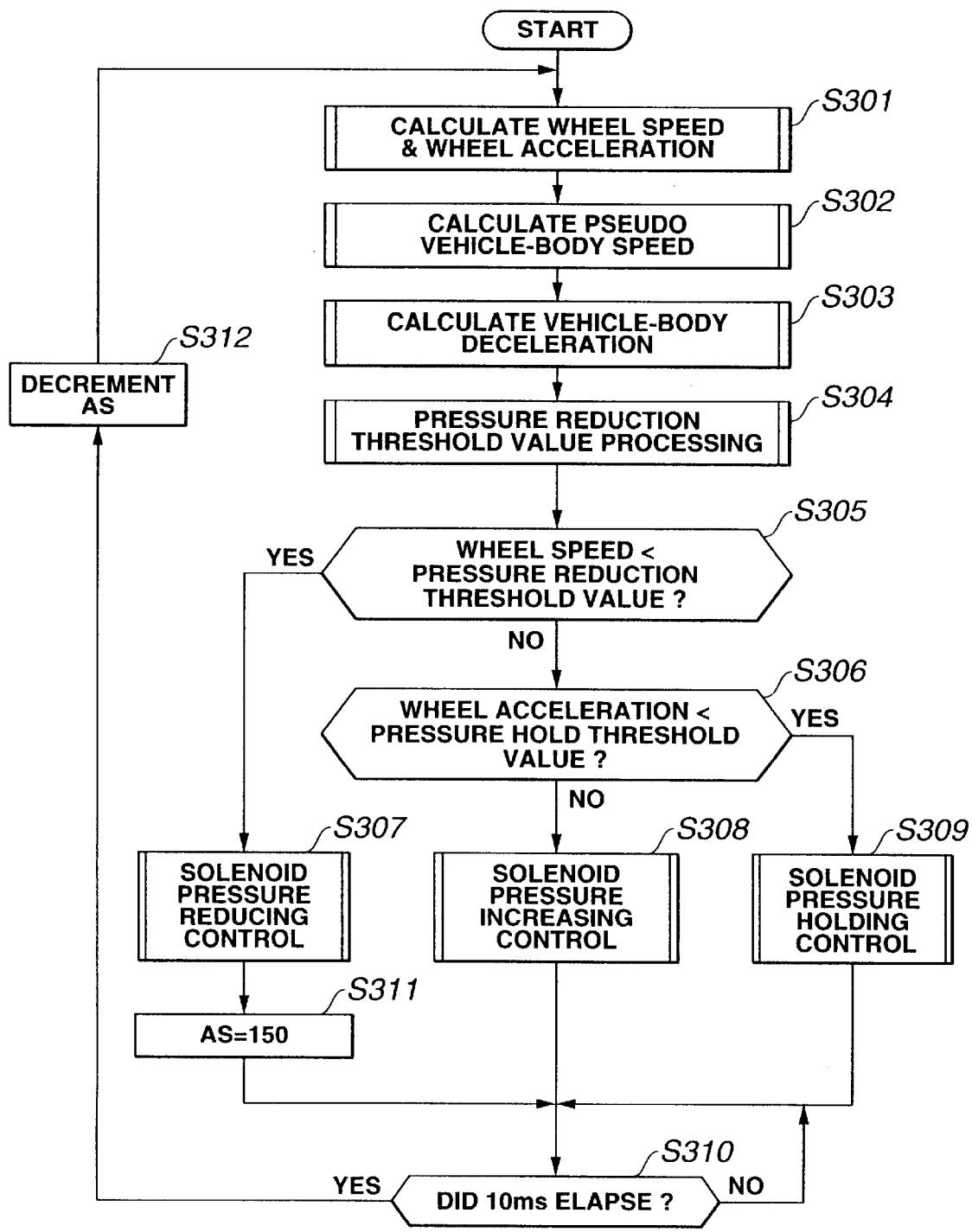
FIG. 16 is a view similar to FIG. 15, showing a third embodiment of the present invention.

Referring to FIG. 16, the third embodiment of the present invention will be explained. The third embodiment corresponds to the invention described in claim 13. FIG. 16 shows flow of antiskid brake control in the third embodiment, wherein pressure reducing control is carried out by comparing optimum slip ratio value VWS as a conventionally known pressure reduction threshold value with wheel speed VW, and wherein optimum slip ratio value VWS is obtained at step S304 after processing at steps S301 to S303 which are similar to steps S101 to S103 in the first embodiment. At a subsequent step S305, it is determined whether or not wheel speed VW is smaller than optimum slip ratio value or pressure reduction threshold value VWS. If it is determined that VW<VWS, flow proceeds to a step S307 for pressure reducing control, whereas if it is determined that VW>VWS, flow proceeds to a step S306 where it is determined whether or not wheel acceleration VWD is smaller than a predetermined pressure hold threshold value. If it is determined that wheel acceleration VWD≧pressure hold threshold value, flow proceeds to a step S308 where pressure increasing control is carried out, whereas if it is determined that wheel acceleration VWD<pressure hold threshold value, flow proceeds to a step S309 where pressure holding control is carried out. Subsequent to step S307 for carrying out pressure reducing control, flow proceeds to a step S311 where antiskid timer AS is set to 150. Subsequent to any of steps S311, S308, and S309, flow proceeds to a step S310 where it is determined whether or not 10 msec of one cycle of control has elapsed. If it is determined that 10 msec has elapsed, flow proceeds to a step S312 where antiskid timer AS is decremented by 1.

Figure 17:
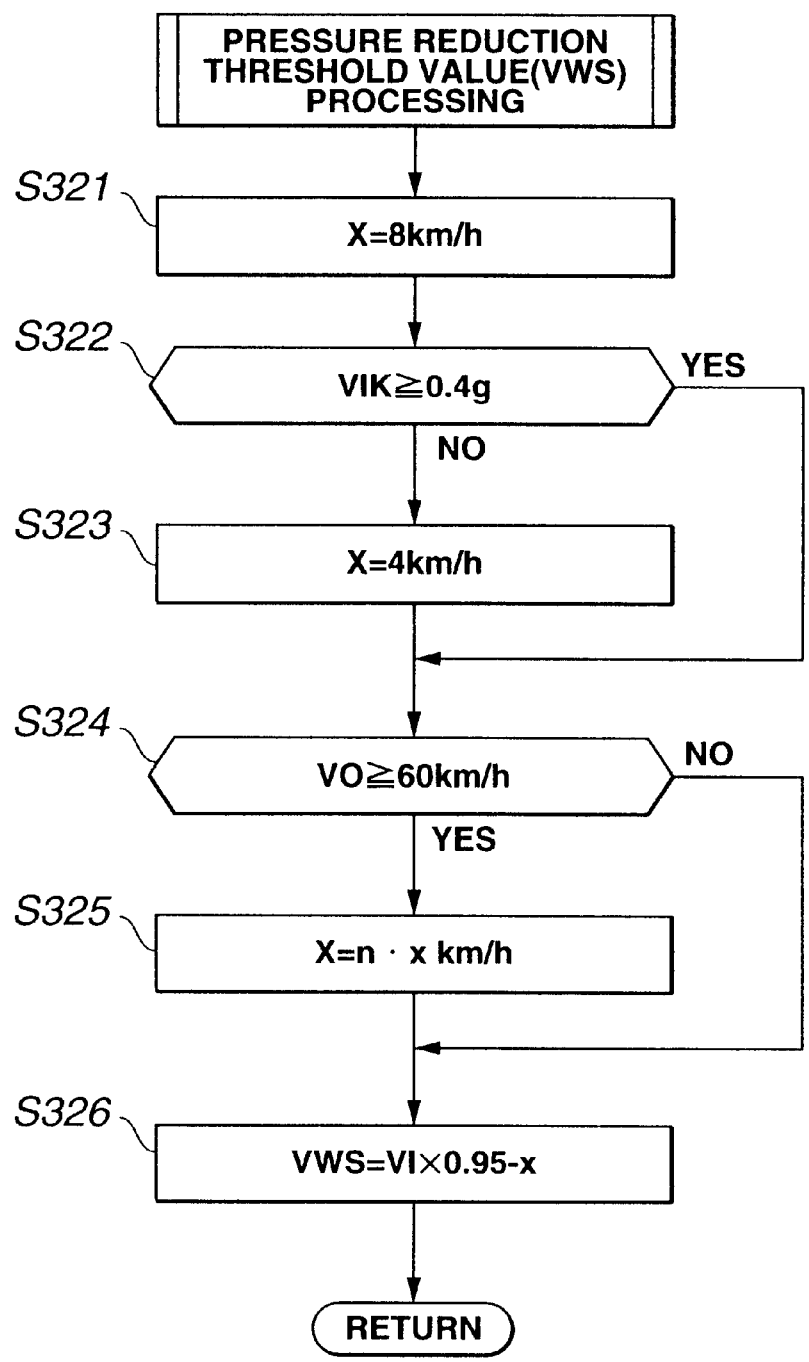
FIG. 17 is a view similar to FIG. 16, showing processing for obtaining an optimum value of slip ratio, i.e. pressure reduction threshold value in the third embodiment.

FIG. 17 shows a flow chart for obtaining optimum slip value VWS. First, at a step S321, constant "x" as will be described later is set at 8 km/h. At a step S322, it is determined whether or not the vehicle-body deceleration VIK is equal to or greater than 0.4 g, i.e. it is a high-μ road. If it is determined that VIK≧0.4 g or it is a high-μ road, flow proceeds to a step S324, whereas if VIK<0.4 g, flow proceeds to a step S323 where constant "x" is changed to 4 km/h, then, flow proceeds to step S324.

At step S324, it is determined whether or not operation reference value V0 or pseudo vehicle-body speed VI at the start of execution of pressure reducing control equal to or greater than 60 km/h (which is not limitative). If it is determined that V0≧60 km/h, flow proceeds to a step S326, whereas if it is determined that V0<60 km/h, flow proceeds to a step S325 where constant "x" is set at (n·x) km/h, wherein "n" is a value smaller than 1, such as about 0.5. At step S325, constant "x" may be (x−m) km/h. That is, at step S325, constant "x" is set at a value smaller than that determined at step S321 or S323. Finally, at a step s326, optimum slip ratio value or pressure reduction threshold VWS is calculated using the expression of VWS=VI×0.95− x.

Figure 18:
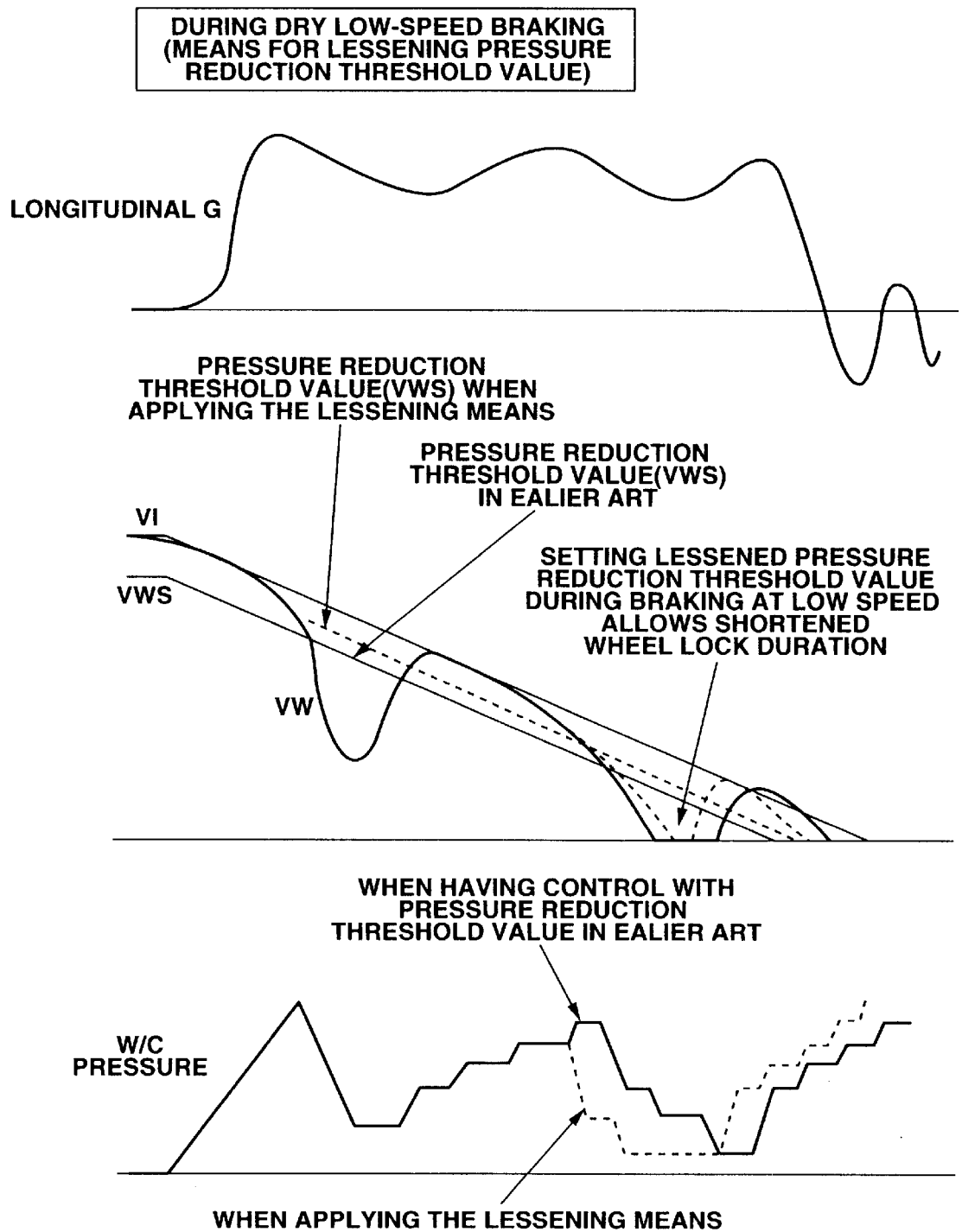
FIG. 18 is view similar to FIG. 13, showing an example of braking at low speed in the third embodiment.

In the third embodiment, therefore, referring to FIG. 18, during braking at low speed, load variations may occur in the low-speed area to produce wheel lock, so that optimum slip ratio value or pressure reduction threshold VWS is set in such a direction as to lessen wheel slip, i.e. in a wheel unlocking direction, allowing thereby shortened wheel lock duration, resulting in stabilized wheel behavior.

Having described the present invention in connection with the illustrative embodiments, it is noted that the present invention is not limited thereto, and various changes and modifications can be made without departing from the scope of the present invention. By way of example, in the embodiments, the pressure reducing control start point is determined in accordance with changing of a value of antiskid timer AS from AS=0 to AS≠0. Optionally, the start point may be determined with a point of braking operation in accordance with signals of a stop lamp switch, etc. Moreover, the specific method of pressure reducing control in antiskid brake control is not limited to that described in the embodiments, and may be in any other form on condition that the pressure of brake fluid in the wheel cylinders can be reduced in accordance with determination of occurrence of wheel slip. That is, commonly known methods can be applied which compare a pressure reduction threshold value formed in accordance with the vehicle-body speed with the wheel speed, wherein a pressure reduction is carried out when the wheel speed becomes lower than the pressure reduction threshold value, and a pressure increase is carried out when the wheel speed returns to the vehicle-body speed.

According to the present invention, quick pressure reduction is allowed when the vehicle-body speed is equal to or greater than the quick pressure reduction prohibiting speed. Even if quick pressure reduction is allowed, wheel lock may not occur at high vehicle-body speed, having relatively small number of times of quick pressure reducing control and quick reduction amount of brake fluid pressure, resulting in less fluid flow from the wheel cylinder to the reservoir. On the other hand, when the vehicle-body speed becomes smaller than the quick pressure reduction prohibiting speed, quick pressure reduction is prohibited. This prevents the driver from having a unfavorable G lowering feel. Moreover, the prohibition of quick pressure reduction reduces the pressure reduction amount, so that even if wheel lock occurs, the amount of brake fluid discharged from the wheel cylinder to the reservoir is restrained. This results in restrained workload of the pump for returning brake fluid from the reservoir to the brake circuit. In such a way, a workload of the pump can be restrained at both high vehicle-body speed and low vehicle-body speed, achieving restrained pump capacity, leading to a reduction in manufacturing cost and size of the system.

Further, according to the present invention, the predetermined quick pressure reduction prohibiting speed is determined in consideration of a pressure reduction threshold value and an undershoot. Thus, in the high-speed area above the quick pressure reduction prohibiting speed at which quick pressure reduction is allowed, even if the wheel speed undershoots the pressure reduction threshold value, it may not reach zero. Therefore, even if quick pressure reduction is carried out as described above, the amount of brake fluid discharged to the reservoir may not become greater. This allows a maximum reduction in the capacity of the reservoir and a restraint of the required capacity of the pump. On the other hand, in the low-speed area below the quick pressure reduction prohibiting speed, when the wheel speed undershoots the pressure reduction threshold value, it can be 0 km/h, i.e. wheel lock can occur. Then, in this speed area, quick pressure reduction is prohibited to restrain the amount of brake fluid discharged to the reservoir, allowing restraint of the required capacity of the pump.

Still further, according to the present invention, during braking at high speed, wheel lock may not occur since load variations subside in the low-speed area. Then, even if, during braking at high speed, the quick pressure reduction prohibiting speed is set at a relatively high value to enlarge the area where no quick pressure reduction is carried out, wheel lock may not occur. Therefore, during braking at high speed, the quick pressure reduction prohibiting speed is set at a relatively high value, allowing not only prevention of the driver from having a unfavorable G lowering feel, but restraint of the operation frequency of the pump which results in a reduction in manufacturing cost and size of the system.

On the other hand, during braking at low speed, wheel lock may occur due to occurrence of load variations even in the low-speed area. That is, the wheel speed is lowered before load variations attenuate and stabilize, causing wheel lock. Then, during braking at low speed, the quick pressure reduction prohibiting speed is set at a relatively low value to allow execution of quick pressure reduction in the low-speed area as well, shortening the wheel lock duration, leading to enhanced stability of the vehicle. In this case, since quick pressure reduction is allowed with higher frequency of occurrence of wheel lock, the amount of brake fluid discharged to the reservoir is increased. However, during braking at low speed, in contrast to during braking at high sped, the frequency of execution of pressure reduction is low before execution of quick pressure reduction, so that the amount of brake fluid is small which is discharged to the reservoir before the vehicle-body speed is lowered to the quick pressure reduction prohibiting speed, and the braking time required up to vehicle stop is short, failing to increase the frequency of operation of the pump even if quick pressure reduction is carried out. Therefore, in this case as well, the capacity of the pump can be restrained. Moreover, shortening of the wheel lock duration allows enhancement in the setting accuracy of the pressure reduction amount.

Furthermore, according to the present invention, the first quick pressure reduction prohibiting speed is set at a value between 10 and 30 km/h for the reason as described above. The second quick pressure reduction prohibiting speed is set at a value where a vehicle behavior fails to become unstable even if wheel lock occurs. Thus, when the vehicle-body speed becomes lower than the second quick pressure reduction prohibiting speed to prohibit quick pressure reduction, wheel lock will be produced with high probability of occurrence, which fails to cause, however, unstable vehicle behavior.

Further, according to the present invention, since the high-speed braking determination value is between 40 and 100 km/h, wheel lock due to load variations can be prevented from occurring in the low-speed area below the first quick pressure reduction prohibiting speed, leading to restrained frequency of occurrence of wheel lock in the speed area where quick pressure reduction is prohibited.

Still further, according to the present invention, during braking at high speed, wheel lock may not occur even if load variations are produced. Thus, reducing the first pressure reduction amount causes a very low possibility of lengthening the wheel lock duration, allowing prevention of insufficient braking force. Moreover, the amount of brake fluid discharged to the reservoir is small, failing to increase the required capacity of the pump. On the other hand, during braking at low speed, wheel lock may occur due to occurrence of load variations. Thus, the first pressure reduction amount is increased to shorten the wheel lock duration. This allows stabilized vehicle behavior and enhanced accuracy of calculation of the pressure reduction amount.

Still further, according to the present invention, the coefficient is changed in accordance with the vehicle speed at start of control, allowing setting of the pressure reduction amount in feedforward control, resulting in calculation of an appropriate pressure reduction amount by simple control.

Furthermore, according to the present invention, during braking at high speed, wheel lock may not occur even if load variations are produced. Thus, setting the pressure reduction threshold value to have more raised wheel slip ratio, i.e. to produce wheel lock cannot lengthen the wheel lock duration. On the other hand, during braking at low speed, wheel lock may occur due to occurrence of load variations in the low-speed area. Thus, the pressure reduction threshold value is set to have more lessened wheel slip ratio, i.e. to release wheel lock, allowing shortened wheel lock duration. This leads to stabilization of a vehicle behavior.

The entire contents of Japanese Patent Application P2001-119497 filed Apr. 18, 2001 are incorporated hereby by reference.

What is claimed is:

1. An antiskid brake control system, comprising:
 a sensor which senses a wheel speed;
 a braking device comprising a valve which allows increase and reduction in a fluid pressure in a wheel cylinder; and
 an electronic control unit (ECU) connected to the sensor and the braking device, the ECU estimating a wheel slip in accordance with the sensed wheel speed and controlling the valve for braking operation in accordance with the estimated wheel slip for an antiskid brake control, the fluid pressure being reduced when the wheel slip is enlarged and being increased when the wheel slip is lowered, the ECU performing a quick pressure reduction prohibiting control to restrain a quick pressure reduction having a greater reduction amount than a predetermined reduction amount when a vehicle-body speed is smaller than a predetermined quick pressure reduction prohibiting speed.

2. The antiskid brake control system as claimed in claim 1, wherein the predetermined quick pressure reduction prohibiting speed is determined in accordance with a value obtained by adding a difference between the vehicle-body speed and a pressure reduction threshold value to an undershoot with respect to the pressure reduction threshold value at execution of the pressure reduction control, wherein the pressure reduction threshold value is a determination reference value for carrying out a pressure reduction.

3. The antiskid brake control system as claimed in claim 1, wherein the predetermined quick pressure reduction prohibiting speed is between 10 and 30 km/h.

4. The antiskid brake control system as claimed in claim 1, wherein the predetermined quick pressure reduction prohibiting speed is changed in accordance with the vehicle-body speed at a control start point.

5. The antiskid brake control system as claimed in claim 4, wherein the control start point comprises a point of starting braking operation.

6. The antiskid brake control system as claimed in claim 4, wherein the control start point comprises a point of starting the pressure reduction by antiskid brake control.

7. The antiskid brake control system as claimed in claim 4, wherein the predetermined quick pressure reduction prohibiting speed comprises a first speed for high-speed braking where the vehicle-body speed at the control start point is equal to or greater than a predetermined high-speed braking determination value, and a second speed for low-speed braking where the vehicle-body speed at the control start point is smaller than the predetermined high-speed braking determination value.

8. The antiskid brake control system as claimed in claim 7, wherein the first speed is set at a value between 10 and 30 km/h, and the second speed is set at a value where a vehicle behavior fails to become unstable even if wheel lock occurs.

9. The antiskid brake control system as claimed in claim 7, wherein the second speed is lower than 15 km/h.

10. The antiskid brake control system as claimed in claim 7, wherein the predetermined high-speed braking determination value is between 40 and 100 km/h.

11. The antiskid brake control system as claimed in claim 4, wherein the antiskid brake control is carried out such that a pressure reduction amount in a first pressure reduction control is greater when the vehicle-body speed at the control start point is lower than when the vehicle-body speed at the control start point is higher.

12. The antiskid brake control system as claimed in claim 11, wherein in the first pressure reduction control, the antiskid brake control carries out a feedforward pressure reduction for determining the pressure reduction amount in accordance with a wheel acceleration, wherein a coefficient by which the wheel acceleration is multiplied is greater when the vehicle-body speed at the control start point is equal to or greater than a predetermined value than when the vehicle-body speed at the control start point is smaller than the predetermined value.

13. The antiskid brake control system as claimed in claim 4, wherein the antiskid brake control is carried out such that the pressure reduction threshold value in the pressure reduction control is changed to have more lessened wheel slip when the vehicle-body speed at the control start point is lower than when the vehicle-body speed at the control start point is higher.

14. An antiskid brake control system, comprising:
 a sensor which senses a wheel speed;
 a braking device comprising a valve which allows increase and reduction in a fluid pressure in a wheel cylinder;
 means for estimating a wheel slip in accordance with the sensed wheel speed;
 means for controlling the valve for braking operation in accordance with the estimated wheel slip for an antiskid brake control, the fluid pressure being reduced when the wheel slip is enlarged and being increased when the wheel slip is lowered; and
 means for performing a quick pressure reduction prohibiting control to restrain a quick pressure reduction having a greater reduction amount than a predetermined reduction amount when a vehicle-body speed is smaller than a predetermined quick pressure reduction prohibiting speed.

* * * * *